US009967529B2

(12) United States Patent
Mitchell et al.

(10) Patent No.: US 9,967,529 B2
(45) Date of Patent: May 8, 2018

(54) OUTPUT LIGHT MONITORING FOR BENCHMARKING AND ENHANCED CONTROL OF A DISPLAY SYSTEM

(71) Applicant: DISNEY ENTERPRISES, INC., Burbank, CA (US)

(72) Inventors: Kenneth J. Mitchell, Borders (GB); Darren P. Cosker, Bath (GB); Nicholas Teixeira Swafford, Edinburgh (GB); Mark A. Reichow, Burbank, CA (US); Michael John Holton, Manhattan Beach, CA (US); John Edgar Park, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 405 days.

(21) Appl. No.: 14/730,596

(22) Filed: Jun. 4, 2015

(65) Prior Publication Data
US 2016/0360167 A1 Dec. 8, 2016

(51) Int. Cl.
*H04N 17/00* (2006.01)
*H04N 9/31* (2006.01)

(52) U.S. Cl.
CPC ......... *H04N 9/3182* (2013.01); *H04N 9/3194* (2013.01)

(58) Field of Classification Search
CPC .................... H04N 9/3182; H04N 9/3194
See application file for complete search history.

(56) References Cited

U.S. PATENT DOCUMENTS

| | | | | |
|---|---|---|---|---|
| 2006/0280360 A1* | 12/2006 | Holub | ...................... | G01J 3/02 382/162 |
| 2009/0169058 A1* | 7/2009 | Chen | ...................... | G06F 3/011 382/106 |
| 2010/0014319 A1* | 1/2010 | Oversluizen | ......... | G02B 6/0051 362/627 |
| 2010/0259474 A1* | 10/2010 | Hildreth | ................ | G06F 3/0317 345/156 |
| 2013/0050504 A1* | 2/2013 | Safaee-Rad | .............. | G09G 5/02 348/181 |

* cited by examiner

*Primary Examiner* — Amit Chatly
(74) *Attorney, Agent, or Firm* — Marsh Fischmann & Breyfogle LLP; Kent A. Lembke

(57) ABSTRACT

An apparatus displaying content to a viewer by adjusting parameters of the content or display devices based on environmental or display device changes. The apparatus includes a display device with a screen providing digital content. A thematic overlay is provided over the display screen to provide diffuse reflection of light striking the front surface. The output light is a combination of the displayed content from the screen and reflection of light from the thematic overlay. The apparatus includes a digital signage benchmarking tool with an output sensing element a benchmarking module processing the sensed output light to generate output light-based data. The apparatus includes a feedback control module modifying a parameter of the display device based on the output light-based data to modify chromaticity or illumination levels of the display device. The feedback control module operates to modify the digital content to provide the displayed content having an adjusted chromaticity.

23 Claims, 15 Drawing Sheets

OUTPUT LIGHT MONITORING FOR BENCHMARKING AND ENHANCED CONTROL OF A DISPLAY SYSTEM

BACKGROUND

1. Field of the Description

The present description relates, in general, to displays such as those used to provide digital signage, and, more particularly, to systems and methods for enhancing backlighting levels (or illumination levels) and/or content provided (e.g., display content or displayed content) with digital signs (or signage) including, but not limited to, digital signage in which a display device or source of the content is camouflaged or disguised to limit or eliminate detection by a viewer (e.g., a translucent texture layer, a thematic overlay, a monitor-camouflaging sheet, or the like may be positioned over a monitor or display screen to hide its presence to viewers).

2. Relevant Background

In many settings, information and images are continuously being presented to viewers or people passing by a location. For example, shopping malls and airport terminals are filled with displays providing information and advertisements. Many of these displays are built up around conventional television monitors and displays such as liquid crystal displays (LCDs) and plasma display devices. These displays have become a standard tool for advertisement, reprogrammable signage, information stations, and menu boards (which together may be called "digital signage").

One of the reasons these display devices have become ubiquitous is the ease of changing content and/or messaging on the display quickly and effortlessly, which may equate to reduced costs, efficiencies in providing new and changing content, and up-to-date information. Further, the costs of LCDs and other display devices have continued to decrease over time while the size of such displays can range from very small screens to many square feet so that these devices are desirable and useful in many business models.

However, in many settings, the use of conventional displays such as an LCD is undesirable. For example, theme parks and other settings such as restaurants often would prefer not to use an LCD or similar device due to the conventional television (TV)-based aesthetics. These settings may have taken considerable effort to provide a thematic decorative scene and simply placing an LCD or similar display in these spaces would spoil the desired effect. For example, a television simply looks out of place in a colonial village or in a wizard's store front. Similarly, it would not be theme-appropriate to use an LCD as a menu board in a "wild west" restaurant or in a renaissance fair booth.

To address these problems, digital signage systems have been developed that provide a thematic or camouflaging overlay over a digital display such as an LCD to provide eye-catching digital signage. For example, U.S. Pat. No. 9,013,515, issued on Apr. 21, 2015 and incorporated herein in its entirety, teaches a system that combines an emissive or transmissive display with a thematic overlay to hide or disguise the presence of the display by setting the display's illumination levels to blend its output with diffuse reflection of environmental light off the thematic overlay.

In this way, the output of the display (e.g., an LCD or other display device) can appear to be writing, artwork, or the like on or in the surface of the thematic overlay, and this overlay may appear to be a chalkboard, a piece of wallpaper, a wood, stone, or other material wall, and so on to fit into a particular display environment to appear "natural" to observers or viewers of this digital signage. The effect provided by such digital signage systems has been received with a great deal of excitement by developers and users of digital signage as it transforms mundane digital signage into a display that is surprising and eye catching.

With increased use of digital signage such as emissive and/or transmissive displays blended with diffuse reflection, a number of problems with their installation and extended use have been identified that may reduce the effectiveness of these display systems or at least reduce the eye-catching ability of such digital signage. For example, one difficulty with deploying such digital signage has been that setup and maintenance can require relatively careful light balancing, e.g., balancing the illumination level of the display device and light in the environment. The effect involves projecting content from a display through a semi-opaque overlay such that front lighting reflects off the overlay material so as to hide the presence of the display when it is off but to allow the display to overpower or match the front lighting when it is turned on or illuminated.

Balancing the emissive, transmissive, and/or reflective components of light observed by the viewer has typically been done manually by manipulating ambient light and display brightness (e.g., changing the illumination level of the LCD or other transmissive or emissive display). This may be effective in applications where the environmental lighting does not change or can be tightly controlled, but there are many applications where light levels in the viewer space change over time (e.g., an outdoor digital sign may be used over the day with a wide range of ambient light). A light sensor can be used to measure illumination levels or brightness of ambient light and the display may be operated in response to vary its illumination level. However, the initial tuning or settings for these adjustments typically have not taken into account component aging and other environmental factors. Additionally, conventional light sensors do not provide any or adequate resolution of a number of display operation parameters such as brightness and chromaticity to effectively control many display systems.

For example, the display's output based on an illumination level setting may vary with age (e.g., the output may become less bright over time at a particular illumination level setting). As another example, shadowing onto the display may develop over time or change throughout a day and such shadowing of the actual output from the display may not be sensed by a simple light sensor. As a further example, the thematic overlay may fade over time so as to become more translucent to light from the display such that previously well-balanced illumination levels for a particular ambient light level may now appear to be too bright (e.g., reveal the presence of the LCD or other emissive or transmissive display) while dust or other environmental objects may cause the thematic overlay to become less translucent such that the display's output may become out of balance over time (e.g., be at an illumination level that is too low to overpower or match diffuse reflection of ambient light off the thematic overlay's surfaces).

Hence, there remains a need for improved digital signage systems that can readily be changed and updated, such as menu boards, advertisements, information signage, and the like that are configured to eliminate the need for manual management or operation of the outputs of the display element(s) to suit varying environmental lighting conditions and/or changing physical characteristics of display components (e.g., changes due to aging of display components such as lower lighting output, changes in reflection characteristics of any overlaying elements, and so on).

SUMMARY

Briefly, the inventors recognized that only monitoring illumination or brightness levels of ambient light in a display environment was not adequate to provide feedback control of a display device in a digital signage system. Instead, it was determined that periodic or real-time (ongoing) monitoring of actual output light from digital signage (e.g., an emissive, transmissive, or reflective display element covered by or hidden behind a thematic overlay element) into a viewer space was much more effective in creating data for controlling operations of the digital signage. For example, it was determined that it would be useful to measure the actual brightness of light (or luminance) output (or projected) by the digital signage and to also measure other output characteristics such as chromaticity of output light. Hence, in the display systems (or digital signage systems) described herein, the display devices are controlled, in a feedback manner, based on monitored and processed characteristics (e.g., luminance and chromaticity) of their present output light into a viewer or viewing space so as to obtain higher quality display imagery as the display's components age (e.g., reduced brightness, varying color qualities, and so on), as environmental or ambient lighting changes in luminance and chromaticity, and as the display surfaces (such as overlay elements, if present) change in their translucence and/or other characteristics.

The present description addresses the above problems by providing a display system that is adapted to blend digital content displayed on a monitor or other display screen with content provided by diffuse light transmission and reflection. This may be achieved in part by providing an emissive, transmissive, or reflective display device such as a liquid crystal display (LCD), light emitting diode (LED) displays, organic light emitting diode (OLED) displays, a digital micromirror device (DMD), a cathode ray tube (CRT) and other available display technology in combination with a thematic overlay such as a light diffusing display element or light balancing component in the form of a slide or diffusive film or the like. The diffusive film may diffuse transmitted light, reflected light or both and may provide an image pattern. In one embodiment, the thematic overlay has a front surface that appears to a viewer to be opaque as it reflects light so that a viewer sees its surface and any "content" thereon (such as a printed graphic or text or just its patterns, colors, and so on). When the display device is operated in an active or "lit" mode, its displayed content is transmitted through the thematic overlay such that the viewer concurrently sees a blend of this display content and the imagery or other effect provided by the thematic overlay. In the display system, the illumination levels of the display device (e.g., LCD or the like) are chosen to suit the illumination levels of a viewer-side light source(s) such that the brightness of the display blends with that of the reflected display.

More particularly, an apparatus is provided for displaying content to a viewer in a viewing space. The apparatus or display system includes a display device with a display screen providing digital content and a light source transmitting light through the display screen such that the digital content is visible as displayed content on a surface of the display screen. The apparatus also includes a thematic overlay positioned over the display screen. The thematic overlay includes a rear surface facing the display screen and a front surface, opposite the rear surface, that is configured to provide diffuse reflection of light striking the front surface from the viewing space such that output light of the apparatus is a combination of the displayed content from the surface of the display screen and the diffuse reflection of light from the thematic overlay. The apparatus further includes a digital signage benchmarking tool with an output sensing element (e.g., a camera or sensor) sensing the output light and also with a benchmarking module processing the sensed output light to generate output light-based data. The apparatus also includes a feedback control module modifying a hardware parameter of the display device (e.g., a transmissive device such as an LCD while other embodiments may utilized an emissive display device or even a reflective display device) based on the output light-based data to modify the light transmitted through the display screen of the display device.

In some embodiments of the apparatus, the hardware parameter is at least one of an adjustable illumination level and an adjustable chromaticity level. In the same or other embodiments, the feedback control module further operates to modify the digital content to provide at least one portion in the displayed content having an adjusted chromaticity.

In some embodiments of the apparatus, the digital signage benchmarking tool further includes a control image element displaying a reference card image (e.g., a Macbeth card image) with a pattern of colored objects. The output sensing element may be a sensor or camera concurrently capturing red-green-blue (RGB) response samples from the reference card image and the displayed content from the surface of the display screen. Then, the output light-based data may include a response profile generated by the benchmarking module by comparing the RGB response samples associated with the reference card image and the displayed content.

In these or other embodiments, the digital content may include an image of the pattern of colored objects whereby the displayed content includes a displayed version of the image of the pattern of colored objects. Then, the response profile is generated by comparing the RGB response samples associated with the reference card image and the displayed version of the image of the pattern of colored objects. Further, the digital content may include a fiducial marker, and the benchmarking module can process an image captured by the sensor or camera to determine an orientation of the display screen relative to the sensor or camera based on a displayed version of the fiducial marker. In such cases, the camera or sensor may be positioned in a plurality of differing locations in the viewing spaces during the sensing of the output light (e.g., to establish RGB responses for a number of viewer locations or viewpoints in the viewing space). In some cases, the feedback control module further operates to modify operations of a light source to modify at least one of luminance and chromaticity of the light striking the front surface of the thematic overlay.

BRIEF DESCRIPTION OF THE DRAWINGS

FIG. 4 illustrates a flow diagram of a method of creating a digital content file for use as input to a display device such as an LCD, a plasma display, or the like.

DETAILED DESCRIPTION OF THE PREFERRED EMBODIMENTS

Figure 1:
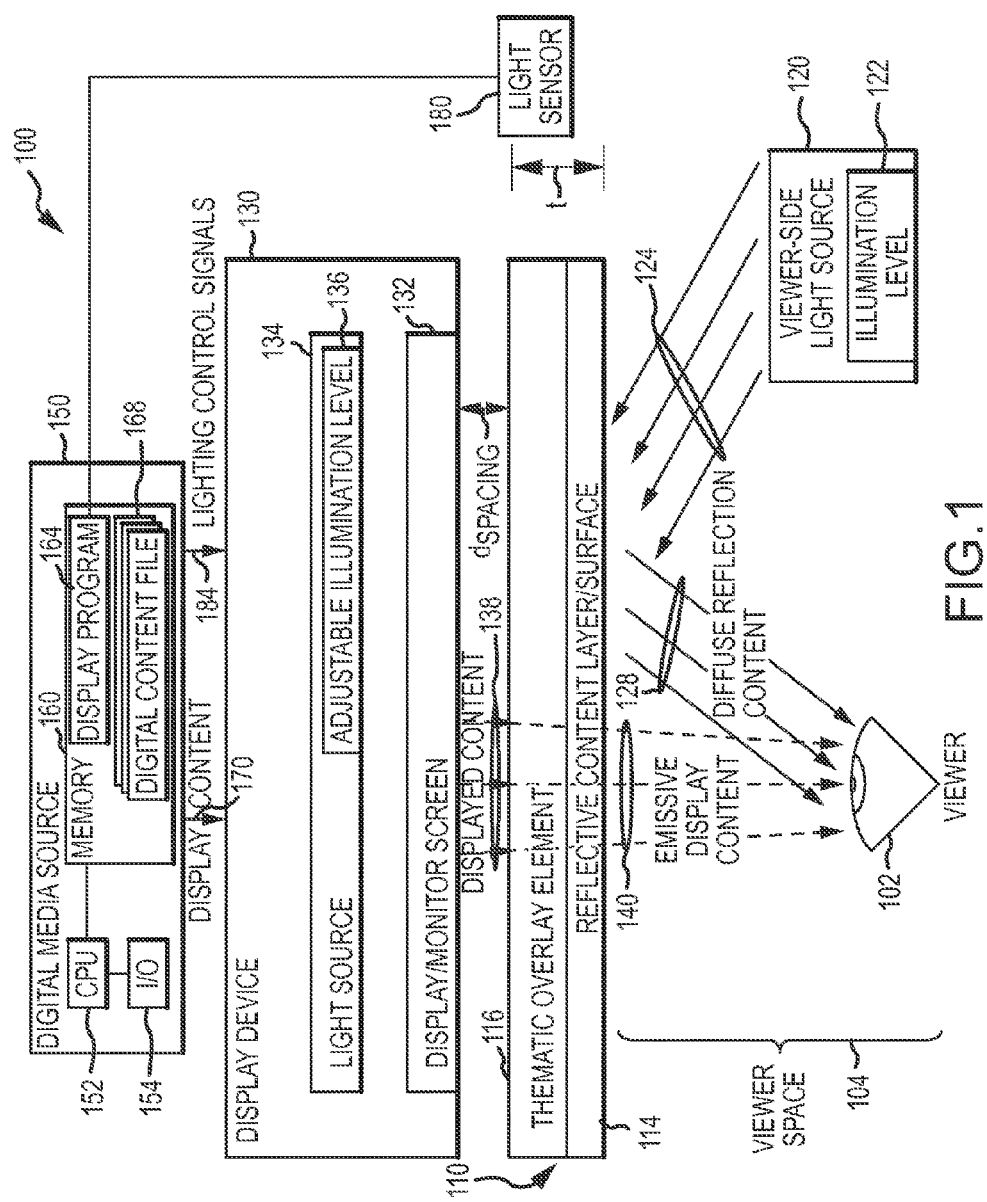
FIG. 1 illustrates in functional block form a display system that includes a display device and a thematic overlay that enable the system to blend content that is provided to a viewer via diffuse reflection and transmission and also light from the monitor or display screen of the display device (e.g., a transmissive device, an emissive device, or the like).

A display system (or digital signage system) is described that is particularly well-suited for use in systems where a display element is covered or camouflaged with a thematic overlay element to assist in blending the output light (e.g., display content) of the display element with diffuse reflection from an outer reflective content layer/surface of the overlay element. Such display systems may include a display device such as a liquid crystal display (LCD), light emitting diode (LED) displays, organic light emitting diode (OLED) displays, a digital micromirror device (DMD), a cathode ray tube (CRT) and other available transmissive, emissive, or reflective display technology in combination with a thematic overlay such as a light diffusing display element or light balancing component in the form of a slide or diffusive film or the like. The diffusive film may diffuse transmitted light, reflected light or both and may provide an image pattern. In one embodiment, the thematic overlay has a front surface that appears to a viewer to be opaque as it reflects light so that a viewer sees its surface and any "content" thereon (such as a printed graphic or text or just its patterns, colors, and so on).

In prior display systems, the systems' operations were typically manually managed to try to achieve a blending of the display devices output light/content with diffuse reflection content from the surfaces of the overlay. The presently described display systems, in contrast, replace manual management with a monitoring and feedback control assembly or system. In brief, an output sensing element such as a camera may be pointed (such as from an anticipated viewer's position(s)) into the viewing space at the display device's display or monitor screen (which may be covered by a thematic overlay element). A control image element, e.g., a Macbeth card or the like with known color values/patterns, is also provided in the viewing space and its image/content is captured by the camera concurrently with output light (display content) from the display device. The display device is periodically operated to display an image matching the image provided on the control image element such that the camera concurrently captures the virtual image (or display content) at the same time as it captures an image of a physical object (or a real world object), with both captured images being obtained under identical ambient lighting conditions. The control image element may be positioned on or near the thematic overlay element's reflective content surface (outer surface), and it may be disguised since it typically is left in place for ongoing management of the operations of the display device.

The camera or other output sensing element enables the monitoring and feedback control assembly to perform real time sampling of parameters of the display device's output light (or display content) such as chromaticity and luminance (illumination level). Additional monitors and sensors can also be included in the monitoring and feedback control assembly and configured to provide real time information about ambient or practical lighting that affects the display device. Data gathered (and, in some cases, processed such as to compare the chromaticity of the control image element with that of the corresponding virtual image provided on the display device screen) from the real time monitor portion of the assembly is used to control the display hardware settings. This feedback control process can be much more comprehensive than was possible with manual management (or even management based solely on sampling of ambient light levels).

Beyond simply automating the manual process, the gathered or monitored information can be used to manipulate content that is being played back by the display device. In a particular example, the monitored or gathered information drives a real time adaptive model that maps the red green blue (RGB) of the content to levels that accurately and reliably produce the desired effect. In addition, scene lighting (e.g., light sources in the viewing space) can be controlled using the same monitored or gathered information. Hence, the level of control provided in the display system goes well beyond that which can be implemented by even a skilled operator attempting manual management. As will become clear, the monitoring and feedback control assembly may be thought of as including an interactive display benchmarking tool (hardware and one or more software modules) for performing display capabilities assessment and a real time adaptive feedback element (hardware and one or more software modules) to represent real surfaces within the capability of the display device. The display system makes it possible to operate the display system to provide a number of creative applications.

Prior to discussing the digital signage systems (or display systems) that include the output light monitoring and feedback devices of the present description, it may be useful to describe a transmissive display-based display system with reference to FIGS. 1-9 that can benefit from the use of the monitoring and control techniques described herein. It will be understood, though, that the benchmarking and feedback control techniques are useful in nearly any display system including those with an emissive display device, a reflective display device, or other light-based or effected display device (or device with surfaces whose appearance can vary with ambient or back lighting). The previously known and implemented display systems were adapted to blend content emitted from or shown on a monitor or display screen with content, graphic imagery, and patterns reflected or transmitted from a front or exposed surface of a thematic overlay. The content that is reflected and/or transmitted from the thematic overlay may simply be texture of the display element's surfaces (such as from a thin sheet of wood paneling or veneer) or may include images, patterns, text, and the like such as on a sheet of wall paper, a poster, a layer of fabric, prints on clear substrates, physical texture molded into/onto a surface, and the like.

The thematic overlay is "camouflaging" in that it hides or disguises the presence of the monitor or display screen both when it is in an "off" or inactive mode and also when it is operated to be "on" or in an active mode in which images, graphics, text, or other digital content is displayed, which results in a set of display content passing through the diffusing display element. The thematic overlay, in addition to being camouflaging, may be thought of as a screen or element that balances both light transmitted and reflected through the material, and, hence, it may be considered a thematic light balancing overlay or thematic light negotiating overlay (with it acting to hide or camouflage the working components to blend into a thematic environment). Note, the overlay does not need to be a material screen but may simply include paint or the like chosen to have a desired amount of transmission as well as reflection. The content provided by the thematic overlay blends with display content to provide a single combined image to a viewer in which all images and information appears to be reflected (i.e., no projection is sensed or identified by the viewer). To this end, the illumination level of the monitor or display screen in these prior devices was adjusted or tuned (e.g., manually at the time of installation) to assist in this blending of the two contents, e.g., by dialing down or shuttering a light source for the monitor/display screen to keep its illumination level at least at or below that of a viewer-side light source (or at the level of the diffuse reflection content in some cases).

The developers of these prior display devices or digital signage systems understood that simply placing an LCD or similar transmissive display in a themed viewer space (such as found in a theme park and many other settings) detracts from the viewer's experience. For example, providing a modern product to display information in an old west setting, in a pirate ship, in a medieval castle, and so on quickly spoils the time period theming for a visitor. Prior to these display systems, designers and operators of themed environments either had to avoid use of digital content or had to live with the look and feel of a rectangular television or monitor hanging in their otherwise carefully and beautifully crafted environments (or has to conform to static signage and menu boards with content and messages that were only updateable by hand). The display systems also addressed the need or desire to provide displays and interesting effects in small and/or short spaces in which projectors with large throws are ineffective. The display systems are rugged and likely have much longer lives than many existing projection technologies such as expensive short-throw lenses and projection lamps that may last less than 2000 hours. Further, the display systems are useful in daylight and other higher ambient light settings and in changing light level applications (e.g., respond to changing light levels on the viewer side by increasing or decreasing the power of the back light source or the like) for a variety of purposes such as presenting information and advertising content in a compelling and theme/environment-appropriate manner, both indoors and outdoors.

The developers of these prior systems discovered ways to camouflage display devices such as LCDs so that they may be utilized in nearly any environment without being visible to a viewer. The display systems implemented guiding lighting principles and specific materials for the thematic overlay (which is positioned between the LCD or other display device and the viewer) with varying reflective and transmissive qualities (e.g., a partially reflective glass pane, a cloth/fabric sheet, a thin wood or paper layer, or the like). The guiding lighting principles included striking a delicate balance of lighting of the front surface of the diffusing layer or element (e.g., the content provided by the thematic overlay layer/surface as termed in FIG. 1) and of lighting of the rear surface of the diffusing layer or element with the displayed content (e.g., with the display/monitor screen of the display device such as an LCD, a plasma display, a television or computer monitor, or the like with a higher brightness such as 1000 to 1500 nit or more).

The thematic overlay made use of the concept that all materials, when struck by light, to various degrees or amounts: reflect a percentage of light; absorb a percentage of light; and transmit a percentage of the received light. When light strikes the surface of an object or material (such as the front or content-bearing layer/surface of the thematic overlay), a viewer's eyes perceive the resulting light from that surface of the object and the brain articulates its color, textures, luminance, and so on. The display systems made use of relevant and appropriate materials for the theming of the environment and the light from the thematic overlay is typically "diffuse reflection" in that the light is being reflected from an uneven or granular surface such that an incident ray of light is seemingly reflected at a number of angles (e.g., is not specular reflection from a mirrored surface). Also, the display systems were adjusted to balance the light on the front and rear surface of the thematic overlay to dictate or selectively define what and when a viewer is able to see a displayed content or only the diffuse display element content from the front surface (e.g., by manually adjusting (at the time of installation) the output light levels of the display device and/or by adjusting/controlling a viewer-side light source to be balanced in a way that makes all light appear to be reflected and not projected to the viewer's eyes).

In some examples of these prior display systems, a high resolution, ultra bright LCD monitor (e.g., 1500 nit or the like) was placed behind a printed chiffon, a real wood thin veneer, a custom printed graphics film, or other thematic overlay. The monitor's displayed content or media may display only video black while the display system is in a dormant or inactive state (e.g., no light is emitted onto the back of the thematic overlay). The front or viewer-side lighting on the front surface of the thematic overlay may be adjusted such as upon initial installation to a level of brightness desired for allowing the material to reflect its images, textures, colors, patterns, and the like to a viewer (e.g., a minimal level of illumination or brightness may be used to allow a human eye to view this diffuse reflection content but not see/detect the monitor positioned behind this element). In this way, the thematic overlay appears to be solid or relatively thick and opaque, e.g., a plank of wood, a painting with physical brush strokes, or even a paper parchment.

In a next operating state, though, the media or displayed content on the monitor is changed so that it becomes more brightly lit or illuminated at a high enough level to be transmitted through the thematic overlay (e.g., transmitted out at a brightness similar to that of the reflected light). That display content overwhelms the front lighting level in the area overlying or adjacent the monitor and dominates the viewer's attention. For example, a viewer may now see the displayed content concurrently with adjacent portions of the front surface of the thematic overlay via reflected light. The content may be a menu, an advertising message, show or other location-specific information, an animated character, or nearly any other desired visual effect that can be caused to magically appear and blend into or dominate what the viewer previously and often will continue to believe is a solid, opaque surface.

FIG. 1 illustrates a functional block diagram of a display system 100 of one embodiment of these previously implemented designs. As shown, the system 100 is adapted for providing a blended display of content provided by the thematic overlay 128 and display content 140 for a viewer 102 located in a viewer space 104 such as a restaurant of an amusement park, a hallway of an upscale shopping mall, and other places where use of a television-type, square or rectangular monitor is undesirable.

To this end, the system 100 includes a thematic overlay or physical screen device (or camouflaging display element or light balancing/negotiating device) 110 that is positioned proximate to or within the viewer space 104 so as to be the portion nearest to the viewer 102. Specifically, the thematic overlay 110 includes a content provided by the diffusing display element layer/surface or front surface 114 that faces outward into the viewer space 104. The display system 100 further includes a viewer-side light source 120 that provides ambient or viewer-side light 124 that strikes the diffusing display element surface 114 causing it to be visible to the viewer 102 as shown by the diffuse reflection content 128. The light source 120 may take many forms to practice the system 100 such as the Sun or other ambient light sources to lighting systems that can have their illumination levels 122 controlled or set by a designer of the system 100, such as upon initial installation and setup, to balance the brightness of light 124 with brightness of displayed content 138 so that these contents 128, 140 both appear to be diffuse reflections from surface 114.

The display system 100 further includes a display device 130 positioned behind the thematic overlay 110 so as to face a rear surface 116 of the thematic overlay (e.g., to project or provide displayed content 138 onto the surface 116 when a light source 134 is operated). An important aspect of the display system 100 is that the thematic overlay 110 is selected or designed to hide or at least disguise the presence of the display device 130 throughout operation of the display system 100. Specifically, the display device 130 (or at least its outer frame members so as to hide its rectangular and television monitor-type shape) preferably is not visible to the viewer 102 when the display device 130 is operated in an off or inactive mode (low or no light levels 136 from source 134) and the viewer-side light source 120 is providing ambient or viewer-side light 124. Further, the display device 130 is not readily visible when the light source 134 is operated in an active or on mode to provide displayed content 138 to the rear surface 116 (and then transmitted through the display element 110 as display content 140 visible by viewer concurrently with diffuse reflection content 128).

To provide this disguising or hiding feature, the thematic overlay 110 is configured to be at least partially translucent or transmissive to pass the displayed content 138 while also being reflective of the light 124. To this end, the element 110 may have a thickness, t, that is chosen to allow light to be transmitted through it from display device 130 (with the thickness, t, depending on the material(s) chosen for display element 110 such as a fabric or a wood veneer or a printed screen/film or the like). The thematic overlay surface 114 may be formed of a printed chiffon with coloring and materials chosen to block the viewer 102 from viewing the display device under highest anticipated illumination levels 122 of light source 120. In other embodiments, the display element 110 may be a sheet of paper or poster board that is transmissive of displayed content 138 but reflects a substantial percentage of light 124 to provide the diffuse reflection content 128. In still other cases, the display element 110 may be formed from a thin panel of wood veneer or similar material that is transmissive of light striking surface 116 (such as the displayed content 138) but reflects much of light 124 as diffuse reflection content 128.

In each of these examples, the diffuse reflection content 128 may be thought of as overwhelming the light 124 that passes through the display element 110, strikes and is reflected from the monitor screen 132, and is transmitted through the thematic overlay 110 such that the viewer 102 perceives the surface 114 as solid and/or opaque and perceives its content 128 when the display device is in the inactive operating mode. The thematic overlay surface 114 typically is not a mirrored surface such that the reflection 128 is diffuse reflection not specular reflection, and, to this end, the surface 114 may be porous such as is the case with many papers, fabrics, wood veneers, and other similar materials. The content 128 viewed by the viewer 102 may simply be the color, texture, and patterns on the surface 114 (such as brown striations of a wood panel) and/or may include graphics or text such as that useful in providing a themed environment for viewer space 104, useful for providing advertising content, and/or useful for providing information (e.g., a menu board, a show time/information board, and so on).

The display system 100 further includes a display device 130 that includes a display or monitor screen 132 facing the rear surface 116 of the thematic overlay 110. The screen 132 may be spaced apart some distance, $d_{Spacing}$, from the surface 116 such as 1 to 6 inches or more to further disguise the presence of the display device 130 from the viewer 102 while, in some embodiments of system 100, the screen 132 abuts the rear surface 116 (such as when the display element 110 is formed of wood veneer or other relatively opaque and/or structurally rigid materials). The display device 130 includes a light source 134 with an adjustable or selectable illumination level 136. It is preferable that the brightness or illumination level 136 be tunable for the light source(s) 134 so that the display device 130 can have the brightness of the displayed content 138 tuned (e.g., based on ambient light levels) to blend with the diffuse reflection content 128 as display content 140 to further avoid detection of the display device 130 (e.g., the content 140 appears to have magically appeared on the surface 114 and to be part of the diffuse reflection content 128).

The display device 130 may take many forms to practice the system 100 (and, of course, more than one monitor screen 132 may be used to provide the device 130). For example, nearly any computer or television-type monitor may be used for the screen 132 (with the size and shape not being limiting to the invention) while some systems utilize high brightness LCDs and/or plasma displays for device 130 such as an LCD designed to be Sunlight readable. In some cases, the light source 134 may be capable of providing ultra high levels 136 of brightness such as up to 1500 nit or the like.

The display system 100 further includes digital media source/controller 150 that may take the form of a computer or similar electronic device with a processor 152. The processor 152 manages operation of input/output devices 154 (such as keyboards, touchscreens/pads, a mouse, and the like as well as monitors, printers, and so on) to allow an operator to enter data or instructions (e.g., to manually tune the illumination levels 136, to select display content 170, to generate the content files 168, and so on) and to receive output or access portions of digital content 168 such as via a display of graphical user interfaces (GUIs) on a monitor 154. The media source 150 may include memory (computer-readable code devices causing computer 150 or processor 152 to perform particular functions such the methods of FIGS. 4 and 5).

The processor 152 may execute code/programs in memory 160 such as a display program 164 that allows an operator to generate digital content files 168 as well as selectively operating the display device 130 to output displayed content 138 by providing display content 170 (from files 168) to display device 130. The display device 130 provides the media in content 170 on display or monitor screen 132, and it is displayed at a brightness in displayed content 138 depending on the setting of the illumination level 136 of light source 134, which may be set by the display program 164.

In some cases, the illumination level 136 is chosen such that the brightness or illumination level of the display content 140 is at or below the brightness or illumination level of the diffuse reflection content 128. To this end, an operator may provide settings in display program 164 for illumination level 136 of light source 134 such as by manually experimenting and tuning the level 136 based on one or more illumination levels 122 of the viewer-side light source 120 and a particular makeup of the display element 110 and content provided by the thematic overlay surface 114.

In other cases, the display system 100 may include a light sensor 180 positioned to determine an illumination level 122 of the light source 120 (or brightness of light 124 striking the surface 114 in viewer space not light output from the surface 114 by the display device 130). The display program 164 may process brightness data from sensor 180 to determine an appropriate setting (see light control signals 184 sent to display device 130) for the illumination level 136 of the light source 134. This setting may be chosen to cause the displayed content 138 to be transmitted through the thematic overlay 110 as display content 140 that desirably blends with diffuse reflection content 128 (e.g., select a level 134 that provides a brightness in display content 140 that matches (or that is a small amount more than so as to at least overcome/overwhelm the content 128 from the portion of the surface 114 that the content 140 is being emitted)) or is less bright than that of the reflection content 128.

Figure 2A:
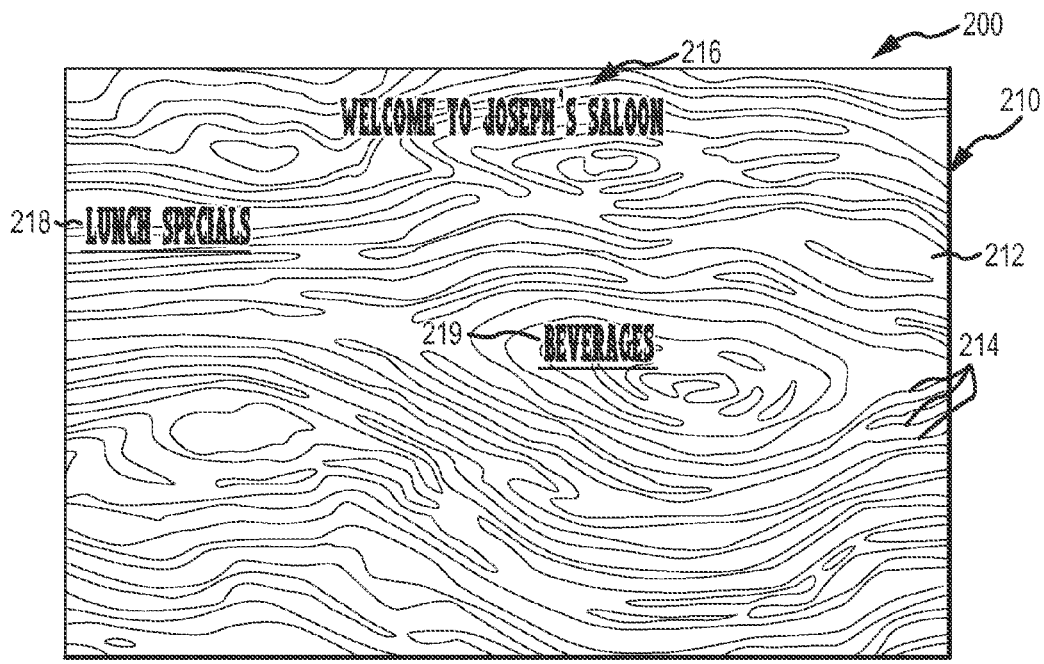
FIGS. 2A and 2B illustrate an exemplary display system with its display device in two operating states, i.e., an off or non-display mode and a display mode.
Figure 2B:
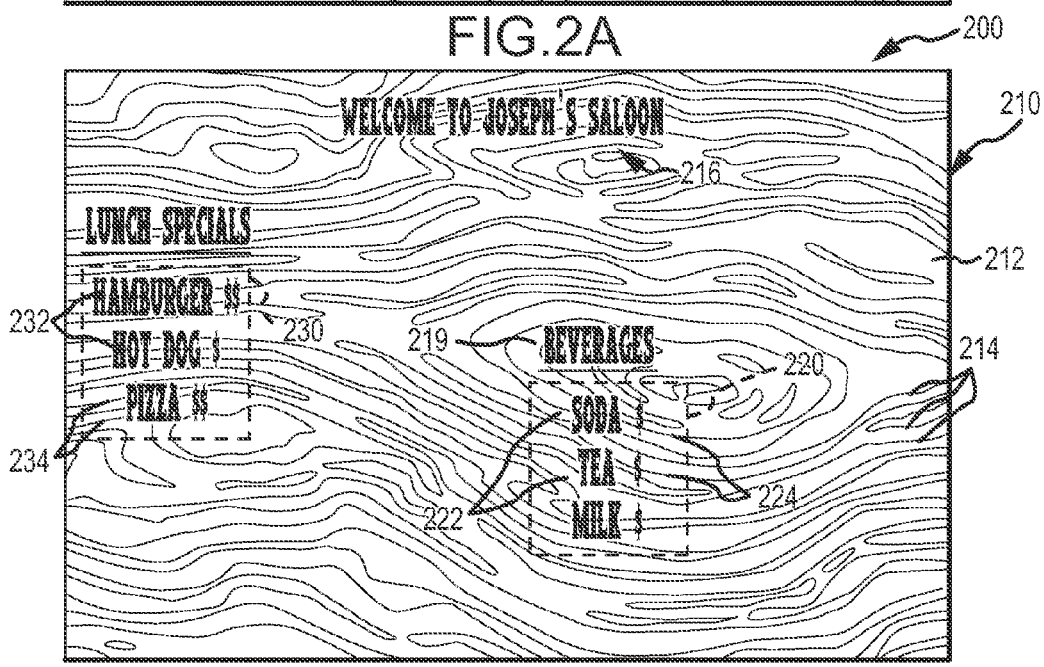

At this point, it may be useful to show a couple of examples of particular implementations and operations of display systems such as may be provided by system 100 and its components. FIGS. 2A and 2B illustrate a display system 200 that is operating in an inactive mode or first operating state as shown in FIG. 2A and then in an active mode or second operating state as shown in FIG. 2B. The system 200 includes a thematic overlay 210 in the form of a thin sheet or panel of wood veneer, with FIGS. 2A and 2B showing the front surface 212 of the display element 210 as it would be seen by a viewer in a viewer space.

The viewer can see the surface 212 with its color (brown and black) and its graphical elements 214 (e.g., natural patterns/striations in the wood itself). The viewer can also see text elements or content 216, 218, 219 indicating, in this case, that the display element 210 is being used to display information pertaining to a restaurant and its offerings. The text elements 216, 218, 219 may be printed on the surface 212 in a font or style that suits the theme of the viewer space containing the display element 210. The graphical or surface content 214 and textual content 216, 218, 219 is visible by the viewer as diffuse reflection due to reflection of light from a viewer-side light source (or ambient light in some cases) (not shown) from front surface 212, which also causes the viewer to perceive the element 210 as a solid and opaque piece of his environment or viewer space.

The system 200 further includes a display device that is not shown in FIGS. 2A and 2B because it is hidden from view by the thematic overlay 210. As shown, the viewer cannot see that an LCD or similar device is positioned directly behind the element 210. Instead, when the display element is operated as shown in FIG. 2A in an off or inactive state (with it showing only black video or with its light source off or at very low brightness levels), the viewer can only perceive graphical/surface and printed textual content 214, 216, 218, 219 on the front surface 212 of the thematic overlay 210.

In FIG. 2B, the display element (such as element 130 shown in FIG. 1) is operated in an on or active mode with its light source at a higher level to produce the displayed content (e.g., to overcome the diffuse reflection of light from portions 220, 230). Dashed lines 220, 230 would not be visible to a viewer but, instead, these are shown to illustrate areas where the display monitor or screen is displaying content from a digital content file. In these areas 220, 230, the display screen is illuminated to show graphic/surface content 224 and 234 as well as textual content 222, 232. Interestingly, the graphic/surface content 224, 234 is configured to align and match with the surface/graphic features 214 of the front surface 212 of the thematic overlay 210 (e.g., the background imagery/media 224, 234 is the same in color/texture and other aspects as the surface 212 and is aligned with existing features 214 of surface 212). In this manner, the viewer finds it difficult to perceive that the images in areas 220, 230 are being provided by a display behind the thematic overlay 210. The textual content elements 222, 232 may be aligned also with textual elements 218, 219 and may be chosen to match their style, color, size, font, and so on such that these magically appearing elements 222, 232 appear to be printed upon the surface 212 similarly to the elements 218, 219. For example, the video playing on an LCD may be the same file (e.g., "x".jpg file) that is printed on the physical material that is placed in front of the LCD.

The example of FIGS. 2A and 2B may be useful if one wanted to produce a digital menu that looks like it belongs within a particular theme environment, e.g., a western frontier or other setting in which veneer or paneling matches the viewer space or surroundings and would not appear to simply be a monitor/display screen. Instead of veneer, a high-resolution image of a wooden fence, brick wall, or the like could have been provided on a graphics film that could be used as thematic overlay 210 in place of the veneer panel/sheet. In other cases, fabric or paper material printed as wallpaper is adhered to a wall that has a cutout behind a portion for the monitor or display screen of the display device. Another version may include a transparency print on acetate with an opaque printed outer zone gradated to the clear transmission zones.

In the illustrated example, it is recognized that wood veneers can be made so thin that they have translucent qualities while still hiding the presence of the display device (as apparent from FIGS. 2A and 2B where the display device cannot be seen but is used to provide display content in spaces 220, 230). The media or digital content files providing the display content for the monitor may include customized fonts and artwork that is displayed on the monitor and visible to a viewer through the thematic overlay.

The design of the display content preferably blends with the look and feel (graphical and textual elements provided on the front surface) of the thematic overlay and is provided at a tunable or selectable brightness from the monitor or display screen by operation of a backlighting source. In some embodiments, the display system includes components or members that allow the front or ambient lighting levels to be defined to selectively light the front surface of the thematic overlay. In this example, the menu content may be changed at any time from a connecting computer workstation and its software (such as source/controller 150 in FIG. 1) or hardware/software provided in the display device without harming or ruining the theming of the viewer space. For example, the display device may be a 16:9 video screen (e.g., an LCD or the like), and viewer or guest in the viewer space would not notice or detect the video screen or be able to determine how the information was changed or updated on the menu board.

Figure 3A:
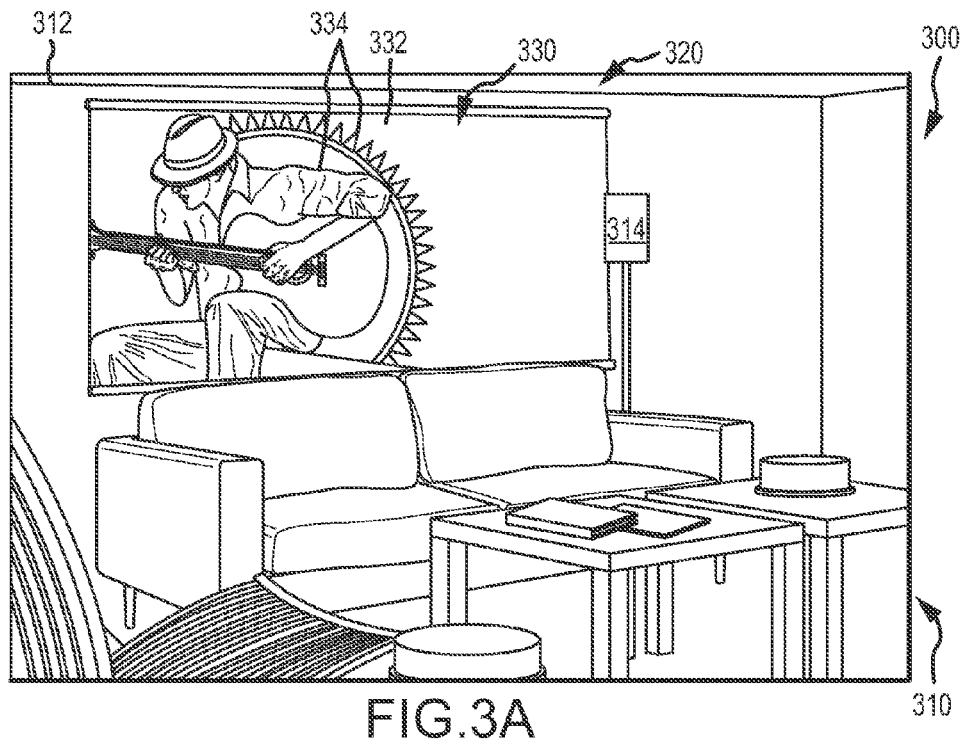
FIGS. 3A and 3B illustrate another exemplary display system similar to that of FIGS. 2A and 2B operating in two operating states to show the thematic overlay hiding a display or monitor and to show the display or monitor then operating to emit a displayed content through the thematic overlay with the display/monitor remaining hidden from view.
Figure 3B:
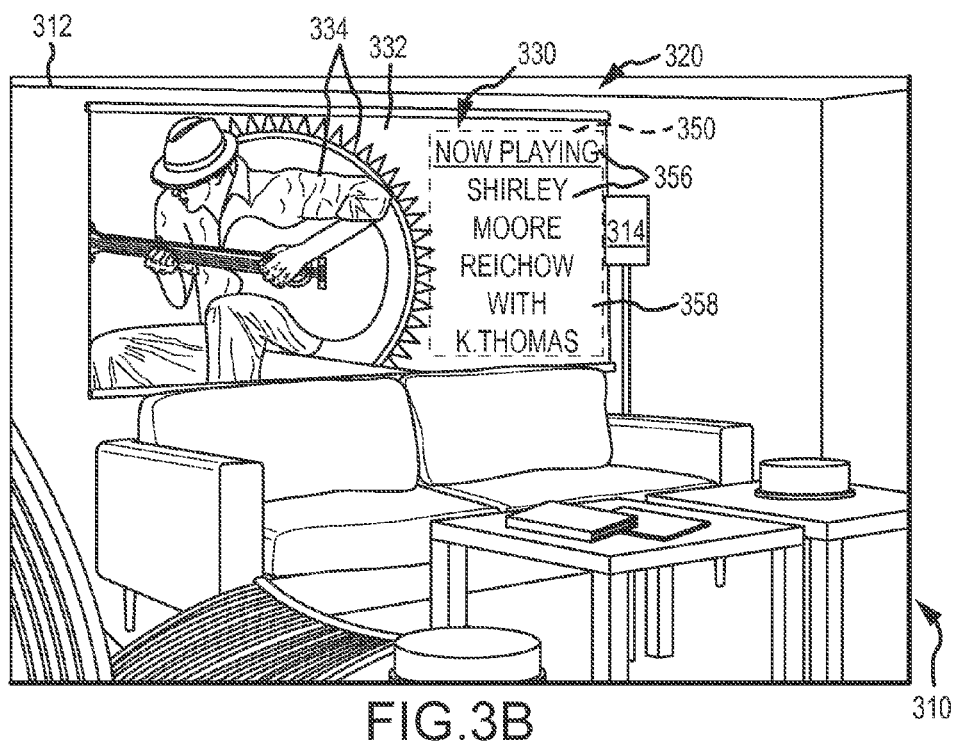

FIGS. 3A and 3B illustrate another display system 300 that may be used to present information that may be updated within artwork or a graphical poster in a room or viewer space 310. The viewer space or themed environment 310 includes a wall 312 and a viewer-side light source 314 that may be set at one or more illumination levels to provide ambient light in the room/space 310. The display system 300 further includes a display device 320 behind (and hidden from view by) a diffusing display device 330 hung on wall 312. The display device 320 is operating in a first or inactive state in FIG. 3A (i.e., at no or low illumination levels). In FIG. 3A, it can be seen that the display device 320 is not readily visible with light from source 314 but this light causes diffuse reflection content from front surface 332 of the thematic overlay 330 to reach the viewer's eye including textual and/or graphical elements/components 334.

In FIG. 3B, the display device 320 is operated at a higher illumination level such that display content is provided in space or area 350 through the front surface 332 of diffusing display device 330. The display content is visible concurrently with the graphical images 334 (which are visible via diffuse reflection of light from source 314). To provide proper blending (e.g., such that no projection is detected), the content in area 350 may include graphical or background components 358 that match graphical elements 334 on surface 332 in color, style, texture, pattern, size, and location (e.g., proper alignment). Further, the content in area 350 may include text-based information 356 in a style that suits the theme of room/viewer space 310. In the example, the display content 356 provides information regarding an upcoming musical show or event, and it will be understood why it is desirable to be able to readily change the content 356 on an ongoing (daily, weekly, monthly, or the like) basis, and this updating can be done by updating the digital content files used as a source of display content for the display device (e.g., change the text 356 to show a new band is playing but retain the aligned and theme-matched background/graphical components 358).

Again, the brightness or illumination levels of the display device 320 is tuned or chosen to suit the thickness and materials of the thematic overlay 330 and also the brightness of light 314 in viewer space 310 (e.g., ambient light) so as to cause the content 356, 358 to be visible over diffuse reflection in the display space or area 350 while not being so high that the monitor or screen of the display device 320 is readily perceived by a viewer in space 310.

Figure 4:
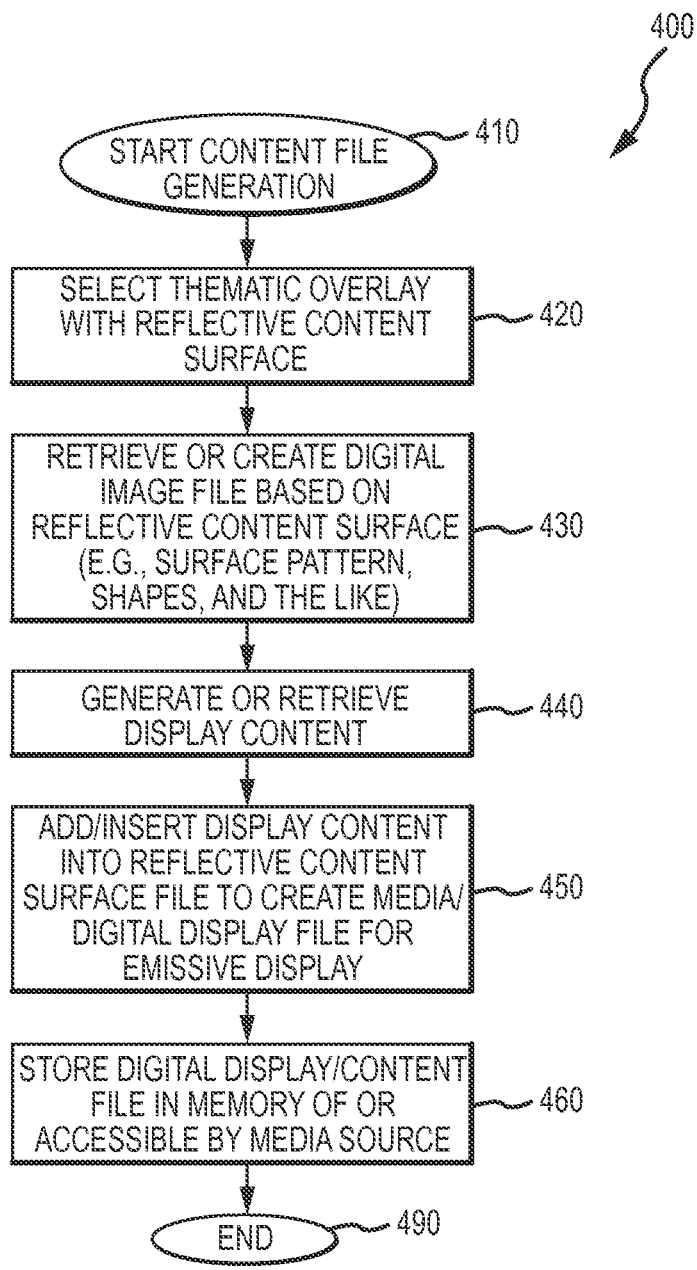

FIG. 4 illustrates a method 400 for generating a digital content file such as one of the files 168, that is used to provide content to a display device for displaying through a thematic overlay (with diffuse reflection content). The method 400 starts at 410 such as with planning of the type of effect or display that is desired as well as the theming and environment in which the display system will be used. The method 400 continues at 420 with selecting a thematic overlay with a particular content provided by the thematic overlay surface. As discussed above, this display element may be a sheet of fabric and the content surface may have a printed pattern with graphic and/or textual components while other embodiments may utilize wood veneer with or without printed text/images or a plastic/paper sheet with printed graphics/text, and have the ability to digitally augment it.

At 430, a digital image file is created for the content provided by the diffuse display element surface such as by creating a digital image of the front surface that is stored in memory of a computer system (such as digital media source 150 in FIG. 1). In some cases, a digital image will be used in step 420 to create the content provided by the diffuse display element surface, and this digital image file may be retrieved at 430 for use in creating a display content file. The file created in step 430 will define the surface pattern, shapes, text, colors, and other information associated with the images/text visible via diffuse reflection from the front surface of the thematic overlay. At 440, the method 400 includes generating or retrieving display content. In other words, the content that a designer wishes to display is retrieved from memory or is created in step 440 and may include textual information for a menu, for an advertisement, or the like and/or may include graphical elements or video. The range of content that may be displayed is nearly limitless, but it may be selected and designed at 440 to suit the theme of the viewer space/environment in which the display system is intended for use (such as a western motif, a medieval castle, a luxury shopping mall, a tropical island village, and so on).

At 450, the method 400 includes adding or inserting the display content into the content provided by the diffuse display element surface file from step 430 to create a media or digital display file for a display device. At 460, this file is then stored in memory that is accessible by the media source or controller (e.g., device 150 of FIG. 1) or directly by the display device. The method 400 may then end at 490 or more digital content files may be generated for the same or other display devices. At 450, the display content from step 440 may need to be manipulated so as to properly align with existing components of the content provided by the diffuse display element surface and/or to better suit its size, style, theme, or other aspects. For example, step 450 may involve retaining the background graphical images from the reflective surface and overlaying textual content from step 440 and then aligning the background images and textual content with adjacent portions of the content provided by the diffuse display element surface (e.g., the displayed content typically will only be a portion of the reflective surface content and preferably is matched and aligned with surrounding/adjacent portions of the reflective surface that are viewed concurrently by a viewer).

Figure 5:
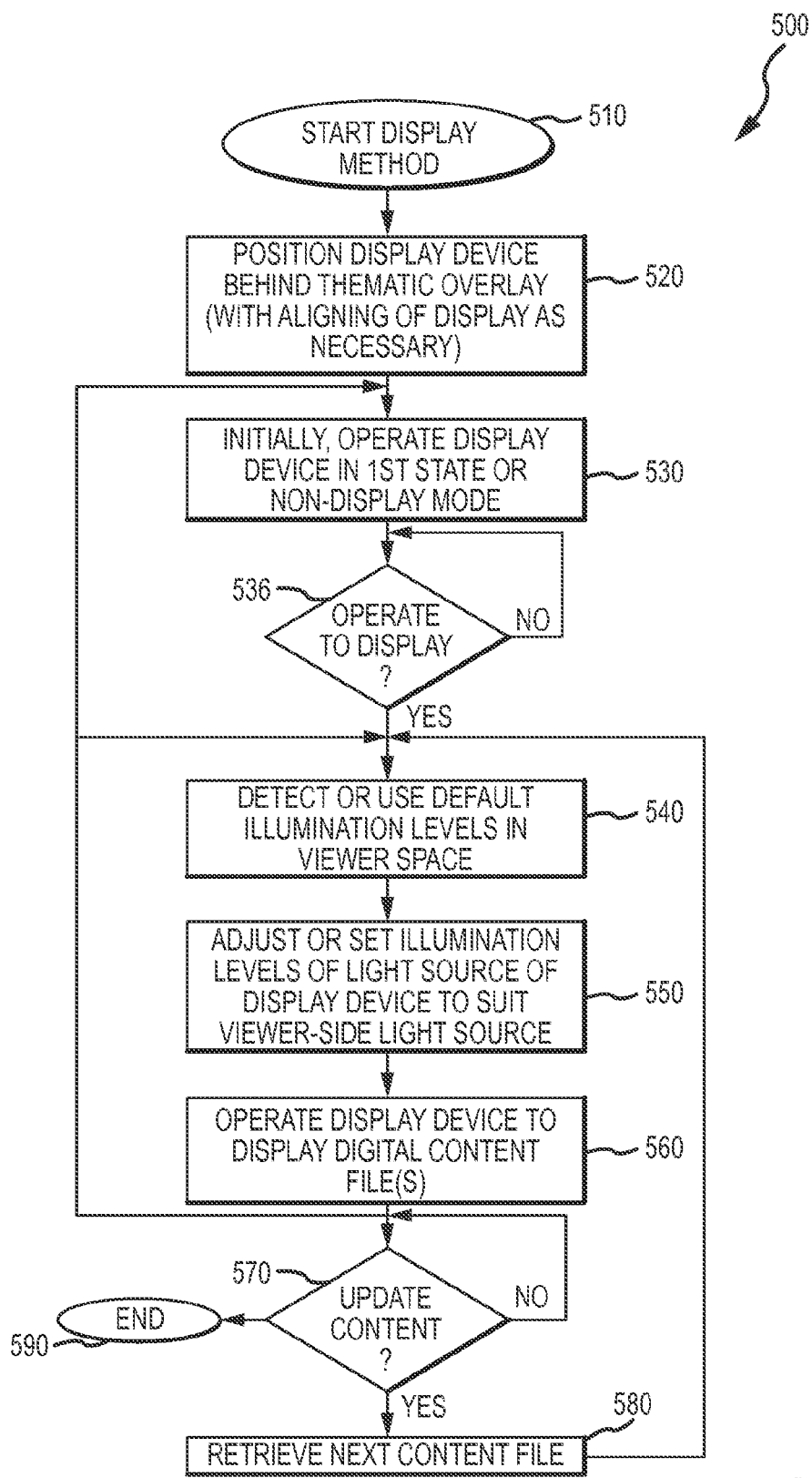
FIG. 5 illustrates a flow diagram of a method of operating a display system.

FIG. 5 illustrates a method 500 of operating a display system (such as system 100 of FIG. 1) so as to properly blend the content provided by the thematic overlay with the display content to hide the presence of the display screen or monitor of the display device. The method 500 starts at 510 such as by selecting a display device and a thematic overlay, e.g., choosing a printed film for the thematic overlay and a Sunlight readable LCD for the display device when the thematic overlay has a front surface exposed to Sunlight or very bright lights. At 520, the method 500 continues with positioning the display device behind the thematic overlay which may include aligning its display screen with a desired portion of the rear surface of the thematic overlay.

At 530, the method 500 may include initially operating the display device at a first operating state (or non-display or inactive mode) in which it displays black video images or its light sources are "off" or dormant so that no display content is displayed through the thematic overlay. At 536, the controller or media source may respond to a display program to determine whether the display should be activated, and, if no, the display device is retained in the first operating or inactive state.

If yes at 536, the method 500 continues with the controller detecting at 540 illumination levels in the viewer space (e.g., at the content provided by the diffuse display element surface) or choosing from one or more default illumination levels expected in viewer space. At 550, the method 500 continues with adjusting or setting illumination (or brightness) levels of the light source of the display device to suit the viewer-side light levels. In other words, the display device may be manually or automatically (via the controller/media source or the like) tuned to illuminate its monitor or display screen containing the display content at levels such that the display content transmitted out from the reflective display surface is able to be viewed by a viewer rather than the diffuse reflection from the display area on this surface. This may call for the same brightness (or percentage higher brightness such as several percent to 10 percent or more increased brightness at the rear surface of the diffusing display device to cause the content to be transmitted through this device's thickness and also be visible with or over the light being reflected to the viewer).

At 560, the method 500 continues with operating the display device to display the digital content files at the selected brightness levels, and this causes the viewer of content provided by the thematic overlay surface to concurrently perceive or view content provided by the thematic overlay and display content (such as contents 128, 140 of FIG. 1). The method 500 may then continue with returning the display device in the first or inactive operating mode at 530 and/or detecting changes in illumination levels in the viewer space or at the content provided by the diffuse display element surface at 540. The method 500 may also include at 570 determining whether the display content is to be updated (e.g., change a menu board to show new meal choices to change from breakfast to lunch or from lunch to dinner). If not, the method 500 may loop back or may end at 590. If yes, the method 500 may continue at 580 with retrieving a next content file from memory of the media source and then continuing with step 540 (or directly to step 560 if there is not changes to the illumination level of the display device).

Figure 6:
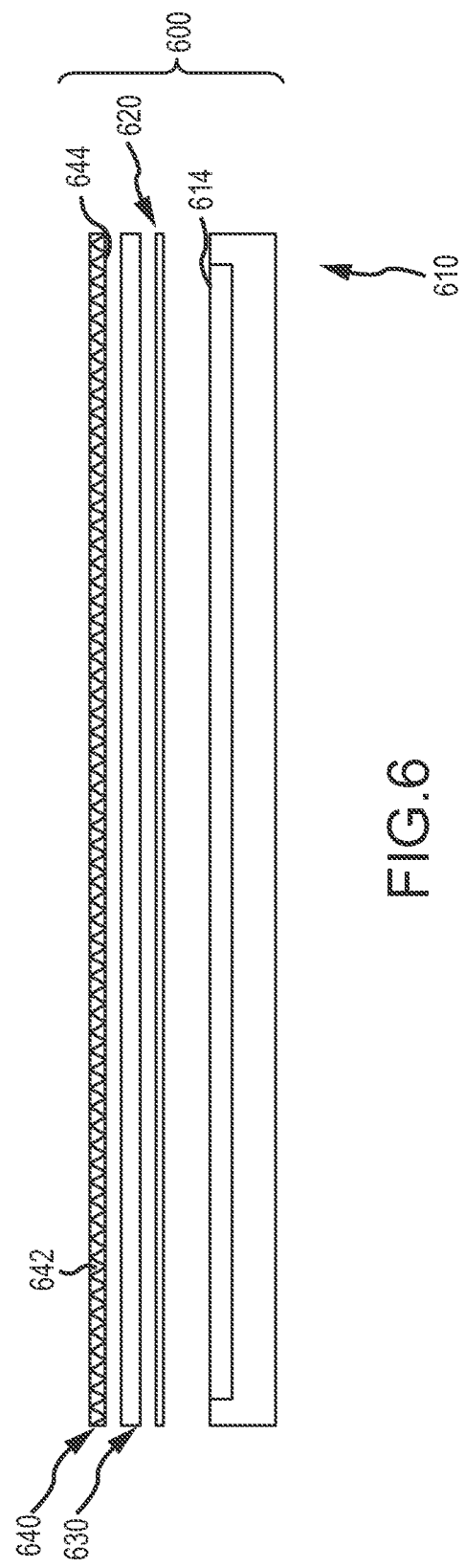
FIG. 6 illustrates a portion of a display system showing use of a combination of a fabric layer (e.g., a flexible and/or thin sheet of material) to provide content provided by the diffuse display element, a structural sheet of transparent to partially translucent material, and mask layer to provide a thematic overlay.

FIG. 6 illustrates another embodiment of a display system 600 that may be used to provide a display that blends content provided by the diffuse display element with displayed content so as to disguise the use of a monitor/display screen. The display system 600 is shown to include a display device 610 such as an LCD TV or the like with a monitor or display screen 614. The system 600 further includes a masking element 620 such as a thin sheet of transparent material (plastic, glass, or the like) that includes a mask that disguises the shape and/or boundaries of the screen 614 (e.g., an opaque layer of paint on a surface of the thin sheet that may be irregular in shape to hide portions of the screen 614 to change the shape of the screen 614 should it be visible via reflected or emitted light), with both hard or a feathered gradation.

The system 600 further includes a structural support 630 upon which a flexible thematic overlay 640 is applied with a front surface 642 facing outward (e.g., toward a viewer in a viewer space) and a rear surface 644 facing inward toward the screen 614 to receive displayed content. In one embodiment, the structural support 630 is a pane or sheet of transparent material such as a polycarbonate sheet, a Lexan® sheet or the like and the element 640 is a fabric sheet or sheet of chiffon with a print providing a graphic/textual content on surface 642 that is visible to a viewer via diffuse reflection of viewer-side light.

Figure 7:
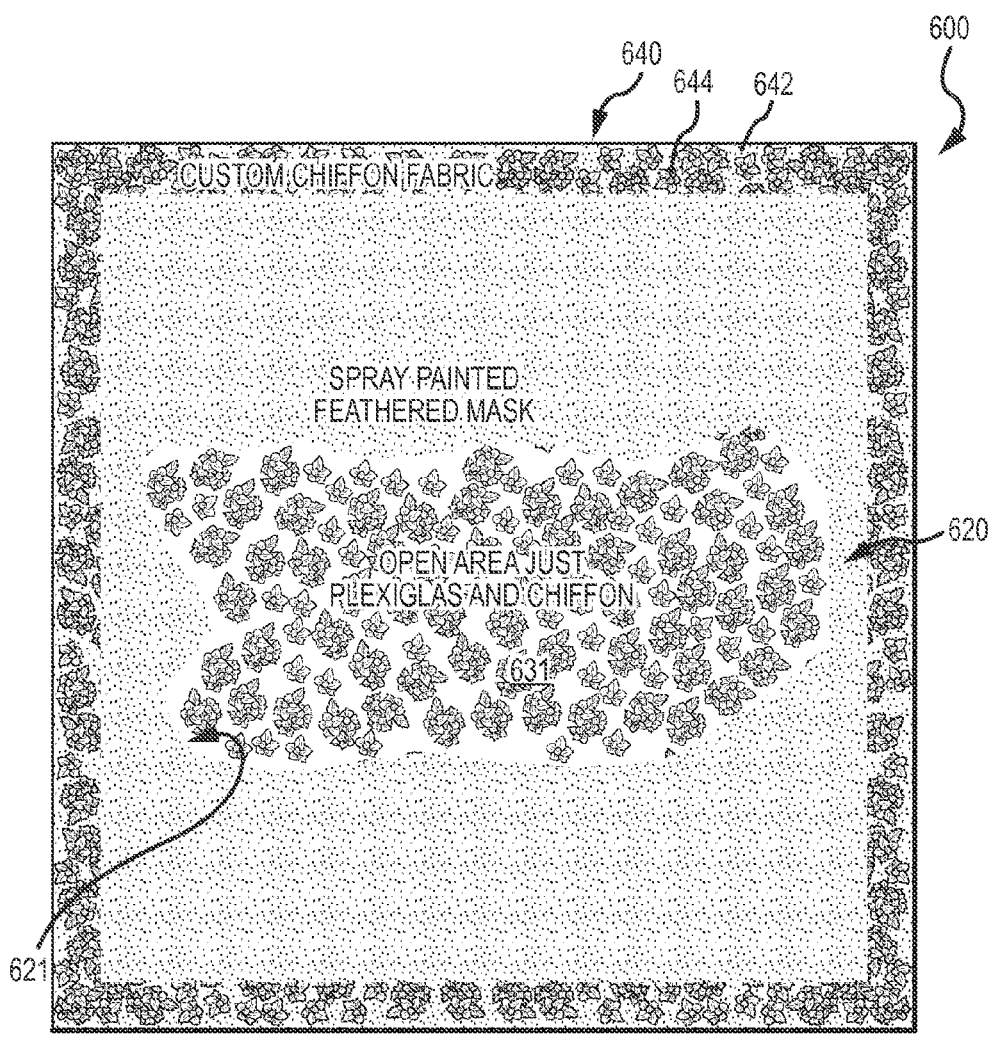
FIG. 7 illustrates a rear or back view of the display system of FIG. 6 (i.e., opposite side from a viewer's side or space) with the display device removed to show one configuration of the mask layer to define an irregular opening or display window to the structural sheet and the fabric or content provided by the diffuse display element layer (and feather the edges of light from the display device (and feather the edges of light from the display device so as to avoid or limit the presence of hard edges that may reveal the illusion or the devices components).

FIG. 7 shows the display system 600 from behind with the display device 610 removed to expose the masking element 620. As shown, the masking element 620 includes a feathered mask 621 that is opaque (e.g., black paint or the like applied to a surface of the pane/sheet of element 620) and defines an irregular shaped (not simply a square, rectangle, a circle or the like that may be expected for a monitor) and feathered edge of a viewing port or window 631 through a structural sheet. When the display device 610 is operated in a display or active mode, its screen 614 will only be able to display content and emit light through port or window 631 to the rear surface 644 of the thematic overlay 640.

Figure 8:
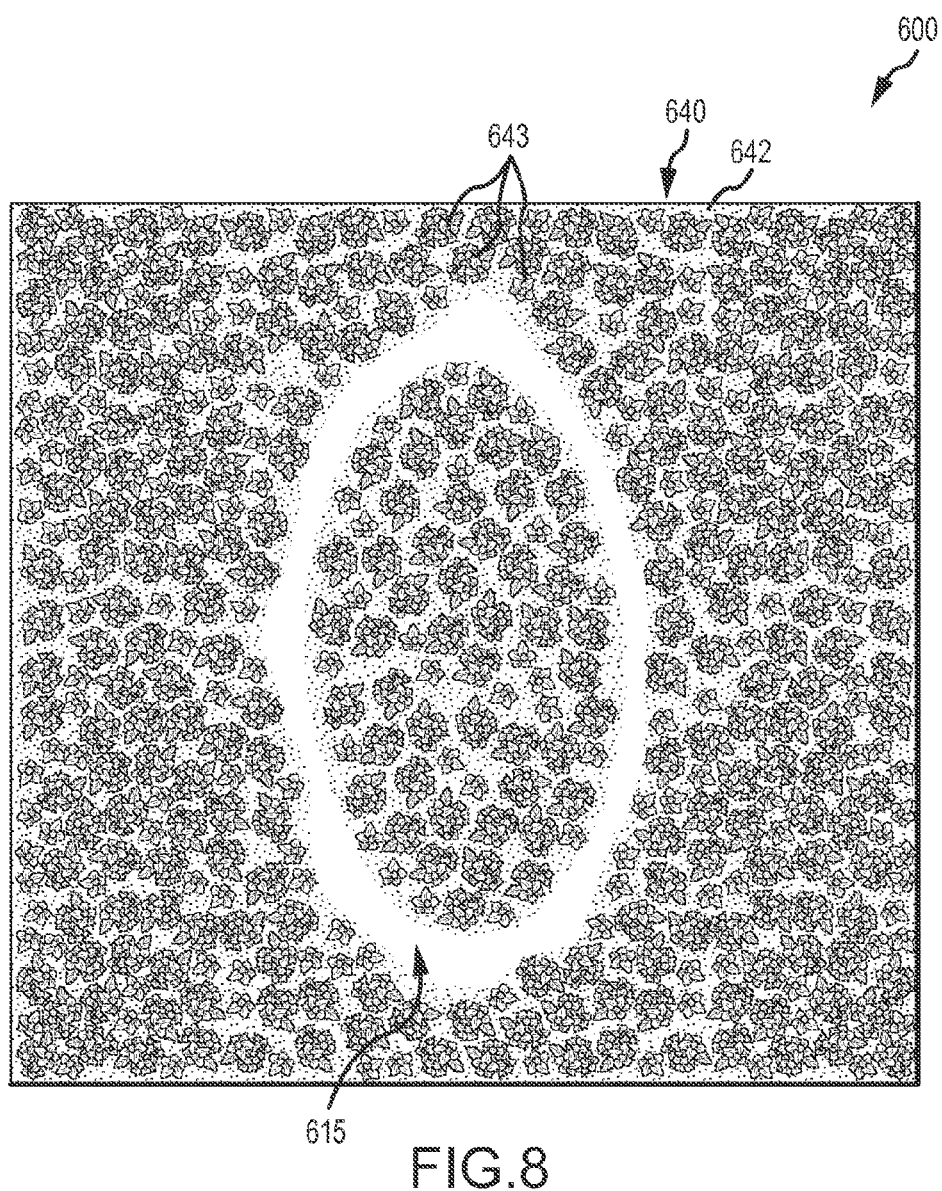
FIG. 8 shows a front view or viewer's point-of-view (POV) of the display system of FIG. 6 with the display device operating to display a graphic image or emitted digital content that may be viewed concurrently with diffuse reflection and transmission content from the fabric layer (based on available ambient or other viewer-side light source(s)).

FIG. 8 shows the display system 600 from the front or a viewer's POV and with the display device 610 operating in an active mode with its screen 614 illuminated by a backlight source. The backlighting is at a brightness or illumination level that causes the displayed content to be visible to a viewer as display content 615 through the thematic overlay 640 (as well as through masking element 620 and a structural sheet with window 631). The displayed content 615 is only visible through the window 631, and it is visible or perceived concurrently with diffuse reflection content from front surface 642 of thematic overlay 640 such as with pattern/graphics 643 in this example. As shown in FIG. 8, the display or monitor screen 614 is not itself visible to a viewer but only the displayed content.

Figure 9:
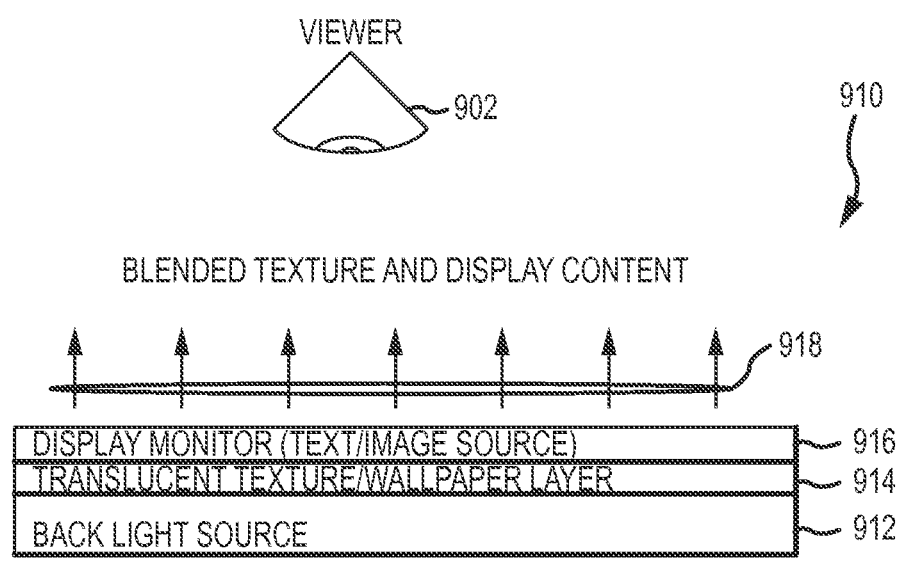
FIG. 9 illustrates another embodiment of a display system in which a content layer is further included in the display device to provide a three-dimensional (3D) effect.

FIG. 9 illustrates another display system 910 that may be used to achieve a three dimensional (3D) illusion for a viewer 902. The display system 910 includes a backlight source 912 upon which a translucent layer 914, such as a sheet of paper, fabric, or the like providing a background texture or graphical image (or text). Without more, the system 910 would allow the viewer 902 to view the background content provided by the layer 914 when the backlight source 912 is operated to light the layer 914. The system 910 further includes a display monitor 916 that functions as a source of foreground content such as text or graphics. When the backlight source 912 is operated along with the monitor 916, the system 910 outputs a blended texture and display content 918 that includes content from the texture or background layer 914 as well as the display monitor or foreground content source 916.

In some embodiments, the display monitor 916 takes the form of an LCD monitor or display screen with its polarized layers and that is operated to digitally present the foreground content (e.g., from a media source as shown in FIG. 1), which may then be displayed concurrently with the content of the layer 914 by operation of the backlighting source 912 (e.g., at a brightness to transmit light through layer 914 and also through monitor 916). Due to the spacing of the layer 914 from the front surface of the monitor 916, a 3D parallax effect is achieved and perceived by viewer 902. In use, the content presented by monitor 916 may readily be changed and updated while the background layer 914 and its media/content are retained.

Figure 10:
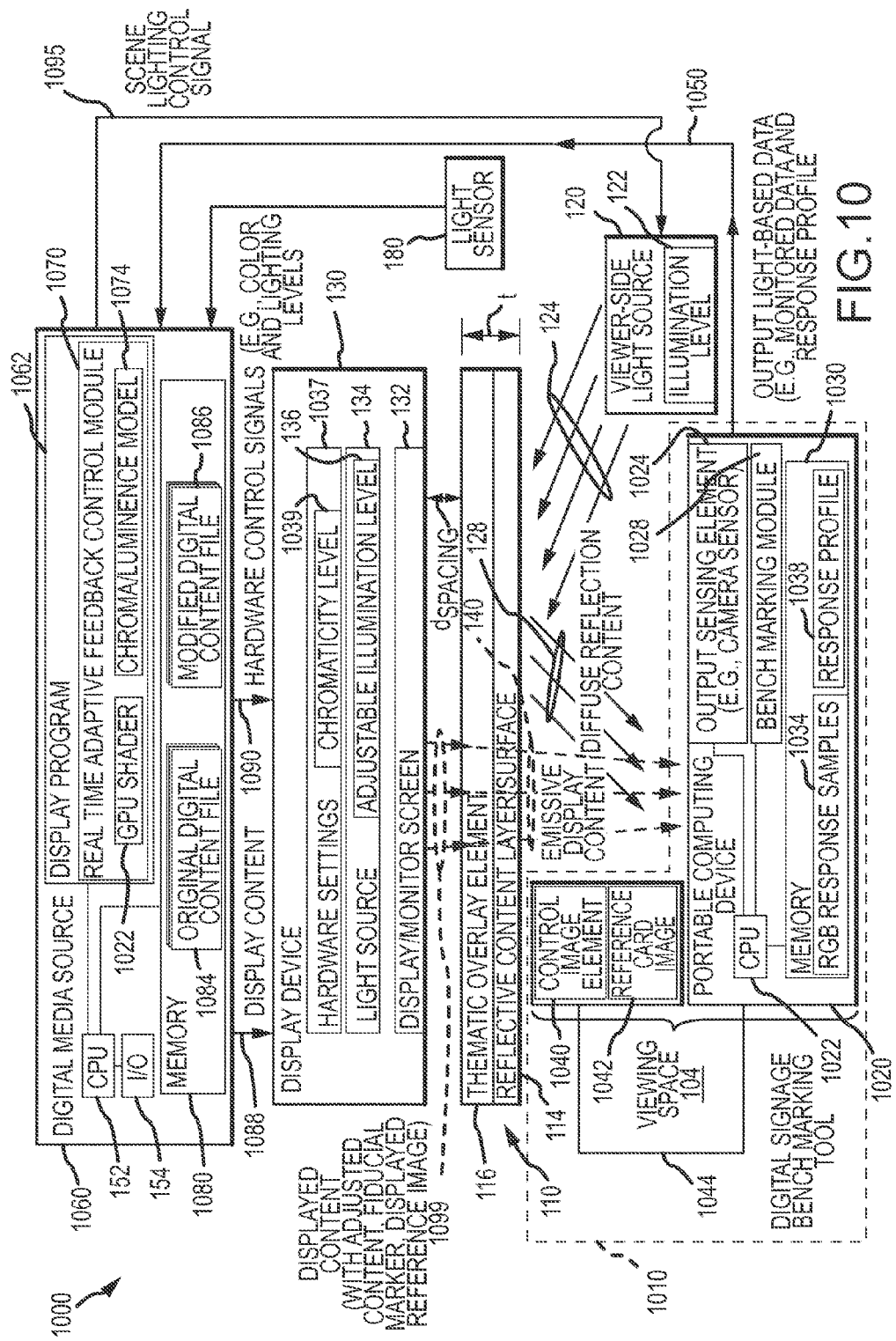
FIG. 10 illustrates a functional block diagram of a display system adapted with a monitoring and feedback control assembly for monitoring in real time operations (output light) of a display device in a viewing space and for providing real time feedback control of the display device.

At this point in the description, a new display method is described that can be used to replace the manual and light-only based controls of the prior systems such as display system 100 of FIG. 1. Particularly, FIG. 10 illustrates a functional block diagram of a display system 1000 adapted with a monitoring and feedback control assembly (including digital signage benchmarking tool 1010 and real time adaptive feedback module 1070) for monitoring in real time the operations (output light 140) of a display device 130 in a viewing space 104 and for providing real time feedback control of the display device 130. The display system 1000 can build upon and modify the system 100 of FIG. 1 such that elements previously described with reference to system 100 are labeled with like numbers and are not described in detail at this point (e.g., reference can be made to the discussion of FIG. 1 for these components such as display device 130 and thematic overlay element 110).

As shown, the display system 1000 includes a digital signage benchmarking tool 1010 that is made up of a portable computing device 1020 and a control image element 1040 linked via cable 1044 to the computing device 1020. The control image element 1040 may be adapted to display or provide a reference card image 1042 (e.g., a known color pattern), and it may be positioned in the viewing space 104 proximate to the display/monitor screen 132 of the display device 130 or on or near to the reflective content layer/surface 114 of the thematic overlay element such that it is illuminated by ambient or scene lighting 124 (from light source 120) to be lit similar to the screen 132 without a thematic overlay element 110 or, as shown, with a thematic overlay element 110.

The portable computing device 1020 includes a processor(s) 1022 managing operations of or accessing/storing data in memory 1030. The device 1020 further includes software/code (in memory 1030 for example) that is executed/run by processor 1022 to provide the benchmarking module 1028 and its functionality. The computing device 1020 also includes an output sensing element 1024 (e.g., a camera, a camera sensor(s), or the like) that has its operations managed by the module 1028 and processor 1022 to sense display content 1040 along with diffuse reflection content 128 (when a thematic overlay element 110 is included in the display system 1000).

The benchmarking module 1028 processes this data to store sets of RGB response samples 1034 for the display device 130 at a particular operating time in viewing space 104 and at present ambient lighting levels such as provided by scene lighting 120 as shown at 124. The benchmarking module 1028 processes these samples to generate a response profile 1038 for the display device 130. The benchmarking module 1028 further acts to transmit a set of output light-based data (e.g., the monitored data including RGB response samples 1034, the response profile 1038, and the like) 1050 to the digital media source 1060 for processing and use by the real time adaptive feedback module 1070 in controlling operations of the display device 130.

As shown, the display system 1000 includes a digital media source 1060 with a processor 152, I/O devices 154, and memory 1080. Further, the digital media source 1060 includes a display program 1062 provided by the processor 152 executing software code/instructions/programs. In contrast to the display program of system 100 in FIG. 1, the display program 1062 includes a real time adaptive feedback control module 1070 that processes the output light-based data 1050 from the benchmarking module 1028 and/or tool 1010 to select display content 1088 and/or hardware control signals 1090 to enhance operations of the display device 130 (e.g., to output desired colors at desired brightness levels). To this end, the control module 1070 may utilize a graphics processing unit (GPU) shader 1022 and/or a chroma/luminance model 1074 (discussed in more detail below).

During operations, the feedback control module 1070 functions in some cases to provide a set of hardware control signals 1090 to adjust the hardware settings 1037 of the display device 130 such as to adjust the color or chromaticity levels 1039 of the display device 130 and/or to adjust the illumination level 136 of the device's light source(s) 134 (e.g., each may be adjusted independently or in combination to achieve a desired output 1099 and 140). In this way, the display content 140 (or displayed content 1099 when no overlay element 110 is included) can be matched to or modified to approach a color gamut of the reference card image 1042 captured by the sensing element/camera 1024.

In some embodiments, the real time adaptive feedback control module 1070 further or instead may act to process/modify the original digital content file(s) 1084 to create modified digital content file(s) 1086 to provide display content 1088 for display on the display device 130 that achieves a more desirable display content/output light 140 in the viewing space 104 (e.g., with present lighting 124, with a current state of the device hardware, with a current state of the thematic overlay surface 114, and the like). To facilitate processing of the RGB response samples 1034 to create the response profile 1038, the content 1088 and, hence, 1099 may at least periodically (e.g., during feedback control time periods during operation of the system 1000) include a fiducial marker (to determine orientation of the screen 132 relative to the viewing space 104 or a viewer position in the space 104) and a displayed reference image (e.g., an image matching the image 1042 provided on or by the control image element 1040). Further, the feedback control module 1070 may generate control signals 1095 to modify an illumination level of (and/or colors emitted by) the scene lighting sources 120 to change the light 124 to achieve a different viewing result (output light/display content 140 in combination with diffuse reflection light 128).

As will be understood, the display system 1000 provides a control solution by combining functions the digital signage benchmarking tool 1010 (e.g., display capabilities assessment in real time and in varying lighting situations) with a real time adaptive feedback control module 1070 (e.g., to control the display device 130 to provide outputs 140 within the capability of the display device 130 via its hardware and hardware settings 1037). As shown, the benchmarking tool 1010 includes a portable computing device 1020 with a camera sensor 1024 (e.g., a camera sensor from Raspberry Pi or other distributors) and a color reference marker 1040 (e.g., a Macbeth color card or other digital (or non-digital) color checker card) connected to the tool 1020 (or, in some cases, the display device 130) via a video signal cable 1044.

During operations of the display system 1000, the bench marking module 1028 (which may be provided as embedded software in the device 1020) tracks the location and orientation of the display/monitor screen 132 via a fiducial marker the display device 130 is operated to display on the screen 132 and a known location of the reference card image 1042 on control image element 1040 in the viewing space 104. The display device 130 is also operated to display a color reference image on its screen 132 (e.g., via providing of display content 1088 by the feedback control module 1070). In order to analyze the display capability of the display device 130 in the viewing space 104 and its present conditions (e.g., lighting 124 from sources 120), colors from both the reference card image 1042 and the displayed reference image on screen 132 sensed in output content/light 140 are sampled by the camera sensor 1024. Over a sampling time period, the RGB response samples 1034 are recorded for a range of yaw, pitch, front, and light poses to recover/generate (by bench marking module 1028) a response profile 1038 of the colors of the reference card image 1042 against the colors of the displayed reference image on the screen 132. The response profile 1038 provides an analysis of the ability of the display device 130 to show surface reflectance appearance for a range of varying viewpoints and lighting conditions.

The real time adaptive feedback control module 1070 processes the output light-based data 1050 provided by the digital signage benchmarking tool 1010 and adapts one or both of the luminance and chrominance response of the digital display device 130 to account for different lighting 124 and/or viewing direction. This may involve generating hardware control signals 1090 that may change chromaticity levels 1039, illuminations levels 136, or other hardware settings/parameters of the display device 130.

Further, though, the control module 1070 may further correct the displayed signage content 1099 by creating modified content files 1086 from the original files 1080 to provide a new display content feed 1088. To this end, the control module 1070 may provide real time processing of the output light-based data 1050 from the camera sensor 1024 and output from a GPU shader 1072 (or similar component). The control module 1070 may take as input reference card samples compared with digital displayed color samples (e.g., the gathered RGB response samples 1034 and generated response profile 1038 in signal(s) 1050), and the module 1070 adapts the output colors in the display content 1088 and, eventually, in displayed contents 1099 and 140 to better match those of the reference card image 1042 (e.g., by creating a modified digital content file 1086 from original digital content file 1080).

To this end, a chroma/luminance model 1074 may be provided in the control module 1070 that efficiently maps the input samples 1034 to the color output gamut of the particular display device 130. This mapping may not always be fully realizable with a given digital signage display device 130 due to dynamic range and display surface 132 and/or reflective content layer/surface 114 material properties. In such cases, a color appearance model (potentially spatially varying across the display surface 132) may be applicable to provide perceptual adaptation.

Figure 11:
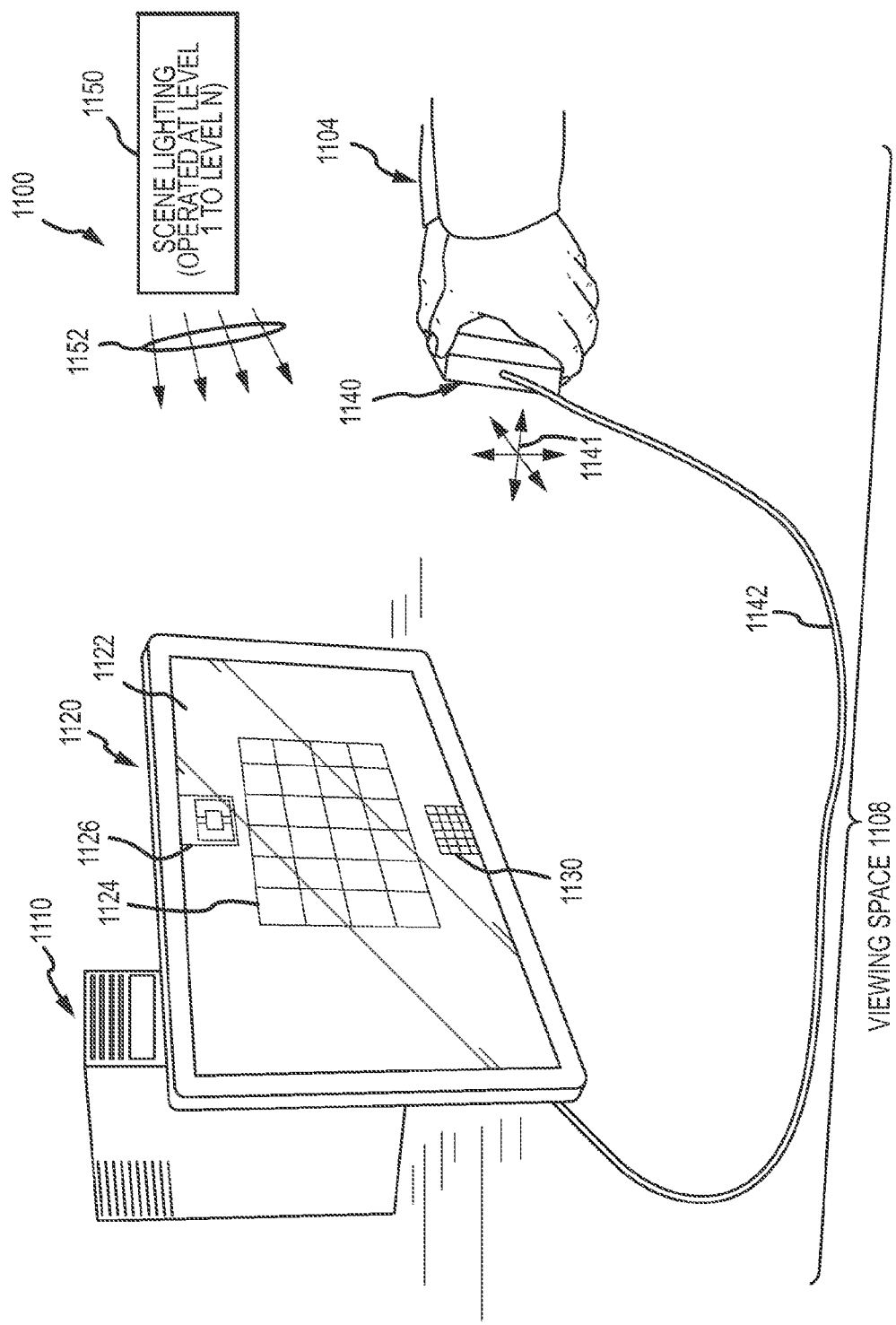
FIG. 11 illustrates an implementation of a simplified display system, such as the system of FIG. 10, during operations to define a response profile for a display device in the display system.

FIG. 11 illustrates an implementation of a simplified display system 1100, such as the system 1000 of FIG. 10, during operations to define a response profile for a display device in the display system 1100. As shown, the display system 1100 includes a digital media server or source 1110 that may be used to practically implement the media source 1060 and, as such, may take the form of a computer/server device with one or more processors running a display program with a real time adaptive feedback module. The server/source 1110 may include (or be replaced by) a controller/computing device providing a real-time engine to affect the media on the fly in response to changes in environmental lighting and/or changes in the output from the display's surfaces. The display system 1100 also includes a display device 1120 (e.g., an LCD monitor or the like), and display system 1100 is "simplified" in that a thematic overlay element 110 is not included in this embodiment (but one may be included to hide/camouflage the existence of the display device 1120 to a viewer in the viewing space 1108 in front of the device 1120).

As shown, the media source 1110 is operating to cause the display device 1120 to display a color reference image 1124 (e.g., a known pattern of a plurality of colors) on a display surface or screen 1122. Further, the display device 1120 is being operated by the media source 1110 to display a fiducial marker 1126 for use in determining the orientation of the screen/surface 1122 in or relative to the viewing space 1108. The viewing space 1108 may be solely illuminated by output light from the screen 1122 during some periods of generating the response profile but in others the space 1108 is illuminated at one, two, three or more illumination levels and/or with varying colored lights/coloring by scene lighting 1150 as shown with arrows 1152 directed toward the screen/surface 1122. The light 1152 may also include ambient light (e.g., from the Sun or other sources not shown in FIG. 11).

The display system 1100 further includes a control image element 1130 such as a digital or non-digital ColorChecker card or the like that is positioned in this example over a portion of the screen 1122 (e.g., to be exposed to identical lighting 1152 as the screen 1122 of display device 1120). The element 1130 presents a reference image such as a pattern of colored objects/shapes, and this pattern and its colors are used to generate content from the media source 1110 for causing the display device 1120 to display the color reference image 1124. The reference card/image element 1130 may, instead, be integrated into the thematics of the scene/display in which the display system 1100 is placed/used so as to appear unobtrusive. Alternative camera sensors with reference card information may further be adapted to the theme of the setting/display. In other words, a Macbeth color card or the like and regular camera is not essential to implement the system 1100, where individual light sensing diodes or spherical lens cameras may be sufficient in a benchmarking tool.

The display system 1100 further includes a benchmarking tool 1140 in the form of a small, portable computing device running a benchmarking module and outfitted with a digital camera sensor (or other output sensing element(s)). As shown, an operator/user 1104 may bold the benchmarking tool 1140 in their hands (i.e., it is handheld in this example) while it operates to collect RGB response samples and to generate a response profile that are communicated over cable 1142 to the media source 1110 for processing/use by the real time adaptive feedback control module. For example, the operator 1104 may position the inlet side/surface of the camera sensor in a plurality of positions relative to the screen 1122 of display device 1120 to collect RGB response samples at a variety of likely viewer positions in the viewing space 1108 (e.g., collect samples with the viewpoint changed and/or with yaw, pitch, and other parameters changed).

Further, the scene lighting 1150 (and/or ambient light contributors) may be varied to provide different levels and quality of light 1152 that strikes the screen 1122 and varies the sensed output light by the tool 1140. Such varying of light preferably is performed at each light sampling position/orientation of the tool 1140 (or vice versa as the tool 1140 may be moved or repositioned 1141 at each setting for scene lighting 1150). The tool's embedded software (e.g., a benchmarking module) acts to generate a response profile for the display device 1120 that can be used to provide real time control over the display device's hardware settings such as to change the chromaticity, the luminance, or other settings and/or to modify the content displayed on the device 1120 to obtain a desired effect (e.g., modify the coloring of portions of the content to obtain colors more closely matching those sensed from the reference image element 1130).

Figure 12:
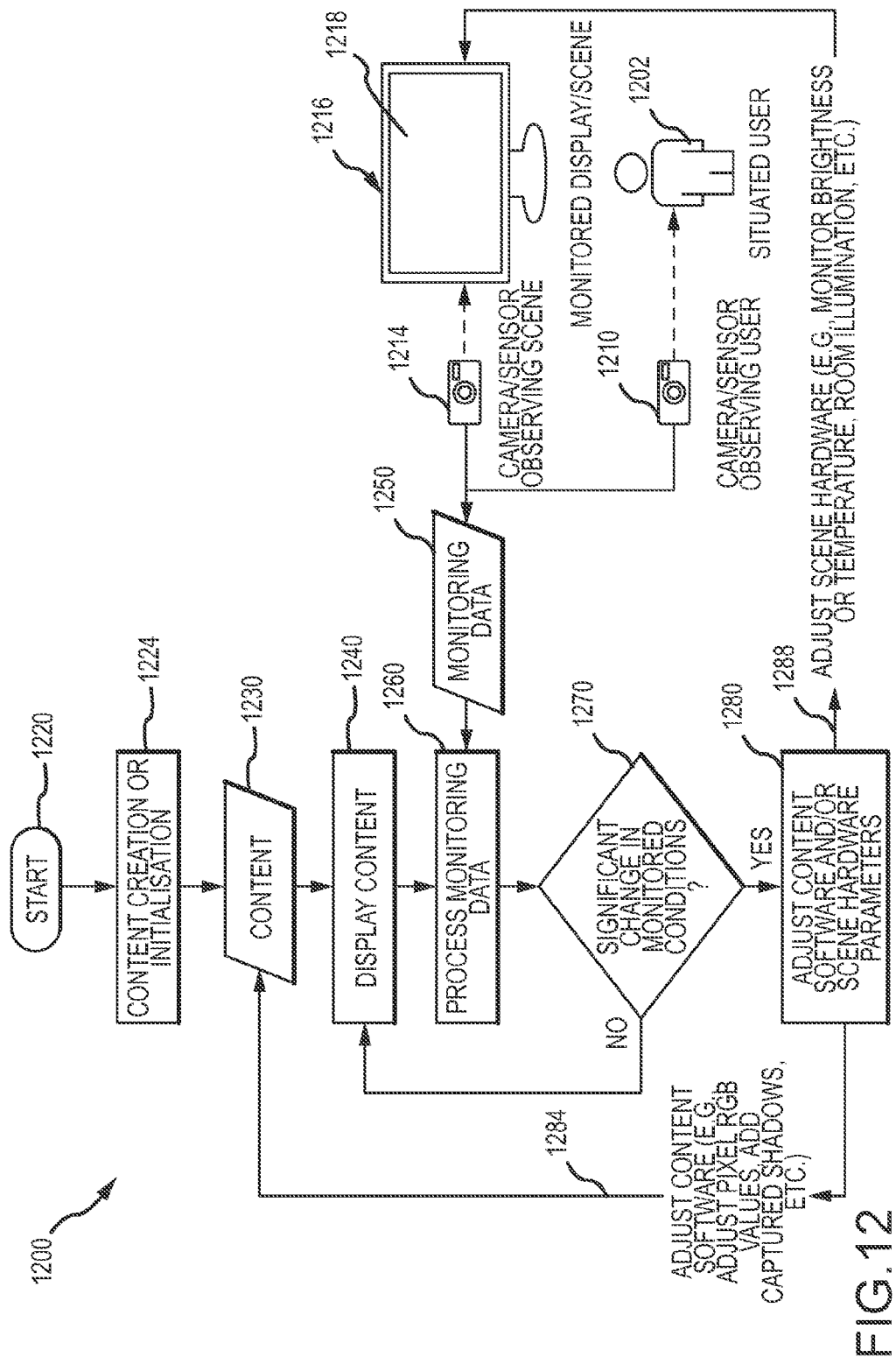
FIG. 12 illustrates a flow diagram showing use of a display system, such as the systems of FIGS. 10 and 11, to provide continuous (or periodic over an operating period) monitoring and feedback control over the display system (e.g., over operations of the monitored display or scene (e.g., scene lighting and/or movable props)).

FIG. 12 illustrates a flow diagram showing use of a display system, such as an implementation of display systems of FIGS. 10 and 11, to provide continuous (or periodic over an operating period such as once every monitoring and control time period) monitoring and feedback control 1200 over the display system, e.g., over operations of the monitored display or scene (e.g., scene lighting and/or movable props). The monitoring and control method 1200 starts at 1220 such as with selecting a display device 1216 (an LCD or useful display device) with a screen/display surface 1218 (with or without an overlay element with none shown in FIG. 12) that is positioned so as to face into a viewing space in which a viewer 1202 may be present and viewing images on or projected from screen/surface 1218 of the display device 1216.

Step 1220 may also involve loading software onto the media source and controller for the display device 1216 (not shown in FIG. 12) such as a real time adaptive feedback control module, which may utilize a GPU shader, a chroma/luminance model, and/or other processing tools. Further, step 1220 may include positioning a digital signage benchmarking tool within the viewing space, and this benchmarking tool may include a portable computing device with embedded processing software (e.g., a benchmarking module) as well as one or more output sensing elements for capturing data regarding the output light from the display surface 1212 and the scene. As shown, the output sensing element includes a first camera/camera sensor 1210 observing the user 1202 and providing data 1250 for processing at 1260 such as for tracking a location and/or viewing position (and angle) for the user in the viewing space relative to the surface 1218. Such viewer position and viewing angle information may be used to control the hardware settings and/or content output by the display device 1216 (e.g., based on a response profile generated by the benchmarking tool for a number of viewing positions, viewing angles, and the like as discussed with reference to FIG. 10).

In step 1220, a control image element (not shown) may also be provided on or near the screen/surface 1218 in the scene (e.g., a Macbeth color card or card display or the like) for facilitating generation of a response profile. Also, in step 1220, a second camera/camera sensor 1214 may be positioned in the viewing space and focused upon the display device screen/surface 1218 and scene, and this output sensing element acts to gather monitoring data 1250 such as RGB response samples for the display device 1216 (and images of the color card or other color checker device) that is stored for or passed to embedded software (e.g., a benchmarking module) for further processing (e.g., to generate a response profile for the display device 1216).

The monitoring and feedback control method 1200 continues at 1224 with creation or initialization of content 1230 such as with a media source/server. This may involve selecting initial still or video, color or black and white imagery to display on surface 1218 to the viewer 1202. Then, in step 1240, the media source/server provides the content 1230 to the display device 1216 for display on or via screen/display surface 1218. The displaying in step 1240 is performed with a current or existing set of hardware parameters of the display device 1216 such as illumination levels, color or chromaticity levels/settings, and the like.

While the display device 1216 is operating in step 1240 to display the content 1230, the benchmarking tool is operated (e.g., on an ongoing or periodic manner) to gather monitoring data 1250 with the one or more cameras/camera sensors 1210, 1214. Then, the method 1200 continues at 1260 with processing the monitoring data 1250. For example, a benchmarking module in the benchmarking tool may act to process RGB response samples with colors of images displayed by the device 1216 on surface/screen 1218 and sensed by camera/sensor 1214. This processing 1260 may generate a response profile for the display device 1216 for use in controlling the display device 1216. In the same or other cases, the processing of the monitoring data in step 1260 may involve comparing most recently received monitoring data 1250 with previously received monitoring data 1250 (such as data collected during start up in 1220 which may have involved "tuning" the hardware settings of the display device 1216 for a particular set of display content, expected lighting conditions in the viewing space, and existing conditions of the display device 1216 and other scene components (e.g., how clean or dusty a thematic overlay will be during operations)).

The monitoring and feedback control method 1200 may then proceed at 1270 with a determination (such as by the real time adaptive feedback control module in the media source/server) of whether or not there has been a significant change in monitored conditions (e.g., has the viewer moved to a new viewing position/viewing angle or has the output light from screen/surface 1218 combined with changes in scene lighting and/or changes in scenery/props or conditions of a thematic overlay if used caused imagery or visual effects to vary from a desired level). Luminance values and/or chromaticity levels may be set within acceptable maximum and minimum values (ranges for these properties of the output light from the screen/surface 1218) for a particular display system or its use, and "significant" can be a change that finds one or both of these monitored parameters outside the predefined acceptable range. If no significant change is identified, the method 1200 continues with displaying the content at 1240 and processing at 1260 newly gathered and received monitoring data 1250 from the sensors/cameras 1210, 1214.

If a significant change is identified at 1270, the method 1200 continues at 1280 with adjusting the content and/or scene hardware parameters such as with real time adaptive feedback. As shown at 1284, the adjusting of the content 1230 may involve adjusting pixel RGB values in the content (increase or decrease as appropriate) such as to try to move the displayed content's chromaticity within a predefined acceptable range. The adjusting of content as shown at 1284 may also include adding shadows to the content 1230 that have been captured by the camera/sensor 1214. As shown at 1288, the adjusting of scene hardware parameters 1280 may involve adjusting the monitor brightness or temperature such as to move luminance within a desired range, may involve adjusting room/scene illumination levels (e.g., if the display device 1216 is at or near maximum illumination levels, the scene lighting levels may be reduced), and/or may involve adjusting the chromaticity or color or other hardware parameters to try to move the chromaticity values for output light/imagery from the screen/surface 1218 into an acceptable range. The method 1200 may then continue with displaying the content 1230 in step at 1240 and with ongoing monitoring of data 1250 with the benchmarking tool including first and second cameras/sensors 1210, 1214.

In the method 1200 of FIG. 12 (and systems of FIGS. 10 and 11), the monitored data or conditions may be more informational such as lighting conditions, atmospherical conditions, and material degradation over time. The cameras/sensors 1210, 1214 may not be cameras but may be photodiodes or other types of light sensors. The monitoring data 1250 from the camera/sensor 1210 with regards to the viewer 1202 is useful for display systems using view dependent material and/or having view dependent display characteristics. In the method 1200, other sense or monitor other scene/display-based data such as scene elements (and their light reflection or other characteristics), for shadows from cast members, to provide light source tracking, and so on.

Interestingly, in the method 1200, the observing scene sensor 1214 observes and monitors (collects data 1250) not only the displayed output from screen/surface 1218 of display device 1216 but also some form of the reference material, color chart, or other reference images in situ, which assists in the realistic matching (in step 1260) of the monitor output. The processing of monitoring data in step 1260 may involve a simple weighted average of sampling the current brightness of the observed reference card/chart and the current brightness of the observed display output from screen/surface 1218. Then, the adjusting in step 1280 may involve weighting to modify the brightness of the content display to achieve a closer matching brightness (shown at 1288). More generally, though, a color cube matching of observed reference colors weighted with observed display output colors gives a color gamut mapping for more precise adaptation for full color video content (e.g., as shown at 1288). Further, capturing the light directions and colors allows the control method 1200 to provide adaptation to be performed (as shown at 1288) on the 3D rendered content 1230.

The description discusses collection of RGB response samples, and this term should be understood relatively broadly as a color response sample that can be collected by a sensor such as, but not limited to a camera. In other words, the invention is not limited to capturing RGB response samples from a conventional digital camera (although this is one useful implementation that has been prototyped and shown effective). Typical RGB samples are subsets of true color, and the control systems and processes taught herein are adapted to capture and represent the best color possible with a particular display. This might involve the use of output or color sensors in the form of hyperspectral cameras, which can be converted into a particular color space.

With this in mind, FIGS. 13A-13F provide graphically and/or schematically illustrations of response profiles that may be obtained as part of a benchmarking or feedback loop adaptive process described herein. A key concept is that control of a display (e.g., via an operating parameter of the display) can be used to adjust the color response (e.g., the RGB response) of the content being displayed to account for ambient lighting conditions. In some useful implementations, a camera is positioned to observe (to focus upon and capture digital images/data) both output from a reference and from a display to compare their two response profiles in existing ambient or environmental lighting conditions.

Figure 13B:
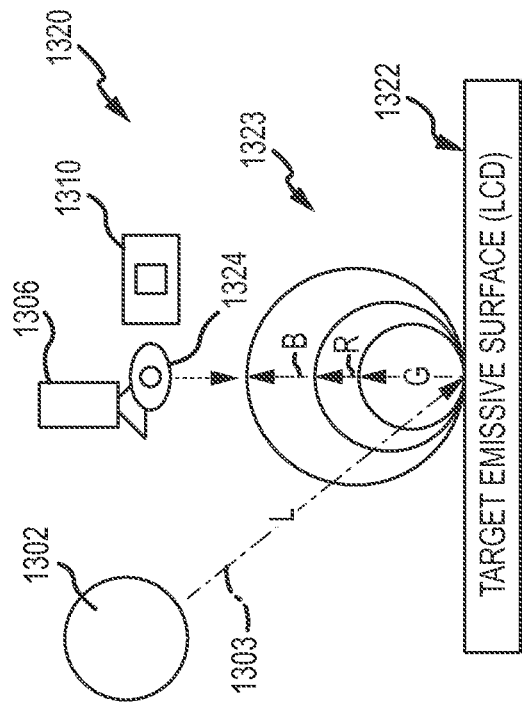
FIGS. 13A-13F are graphic and/or schematic illustrations of response profiles that may be obtained as part of a benchmarking or feedback loop adaptive process described herein.
Figure 13A:
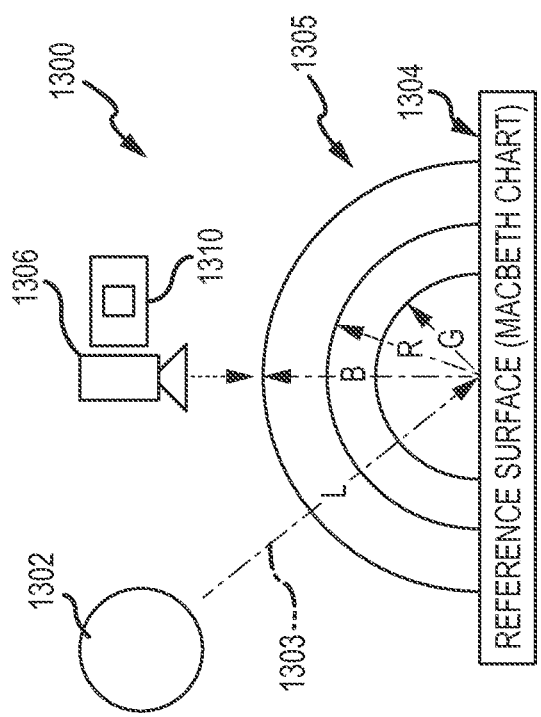

FIG. 13A illustrates a graph 1300 for a viewing space in which ambient light 1303 is provided in the form of full sunlight from Sun 1302 (but another one or more light sources may be provided). A camera (or other sensor) 1306 is provided that captures images of a reference image/surface (e.g., a Macbeth chart/card or the like) 1304 with color responses or chromaticity levels 1305 that can be used to determine a response profile 1310 with full sunlight conditions. Similarly, FIG. 13B illustrates a graph 1320 for the same viewing space with the same lighting conditions (e.g., Sun/source 1302 providing light 1303) where the camera 1306 is used to capture images of a target display surface (e.g., output content/light that may include a displayed image matching that of reference surface 1304 from an LCD or other display device screen) 1322. These images/captured data provide color responses or chromaticity levels 1323 of the content/surface 1322 in these lighting conditions and can be used to determine a response profile 1324 for the target display surface 1322. The two response profiles 1310, 1324 can be compared to determine controls for the display device including the surface 1322 to modify its output to have the two profiles 1310, 1324 better match each other for the light 1303 being provided by source/Sun 1302.

Figure 13D:
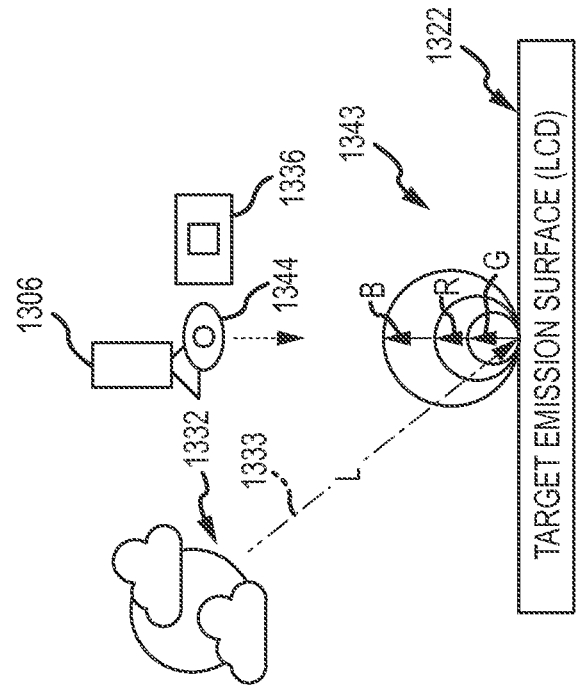
Figure 13C:
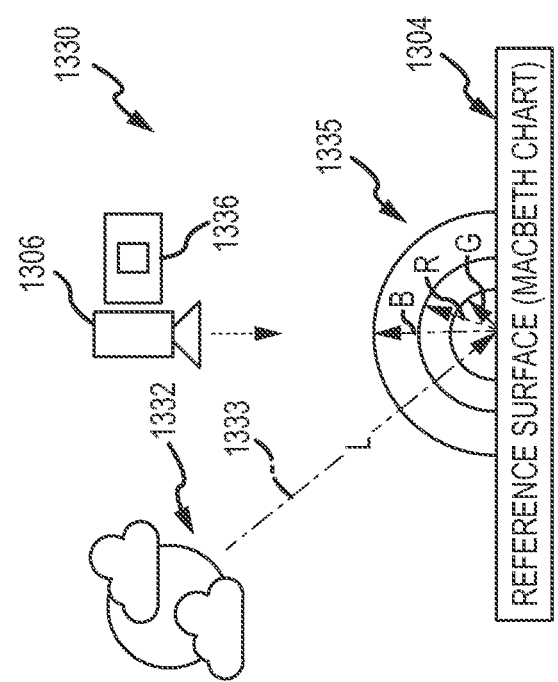

The control techniques described herein are well-suited for addressing changing light conditions and its effects on color outputs of a display device (e.g., cannot simply adjust display settings for full light as shown in FIGS. 13A and 13B when the display device is used in other color conditions). In this regard, FIG. 13C illustrates a graph 1330 for a viewing space in which ambient light 1333 is provided in the form of partial sunlight from source 1332 (shown as the Sun partially blocked by clouds but another one or more light sources may be provided). The camera (or other sensor) 1306 is provided to capture images of the reference image/surface (e.g., a Macbeth chart/card or the like) 1304 with color responses or chromaticity levels 1335, which differ from earlier responses 1305 in full sunlight, that can be used to determine a response profile 1335 with partial sunlight conditions. Similarly, FIG. 13D illustrates a graph 1340 for the same viewing space with the same lighting conditions (e.g., Sun/source 1332 providing partial sunlight 1333) where the camera 1306 is used to capture images of the target display surface (e.g., output content/light that may include a displayed image matching that of reference surface 1304 from an LCD or other display device screen) 1322. These images/captured data provide color responses or chromaticity levels 1343 of the content/surface 1322 in these lighting conditions (which differ from levels 1323 in full sunlight) and can be used to determine a response profile 1344 for the target display surface 1322. The two response profiles 1335, 1344 can be compared to determine controls for the display device including the surface 1322 to modify its output to have the two profiles 1336, 1344 better match each other for the light 1333 being provided by source/Sun 1332.

Figure 13F:
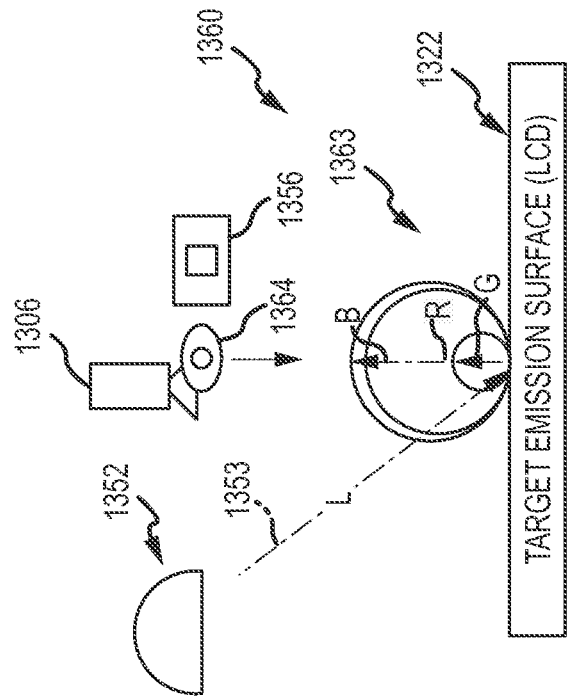
Figure 13E:
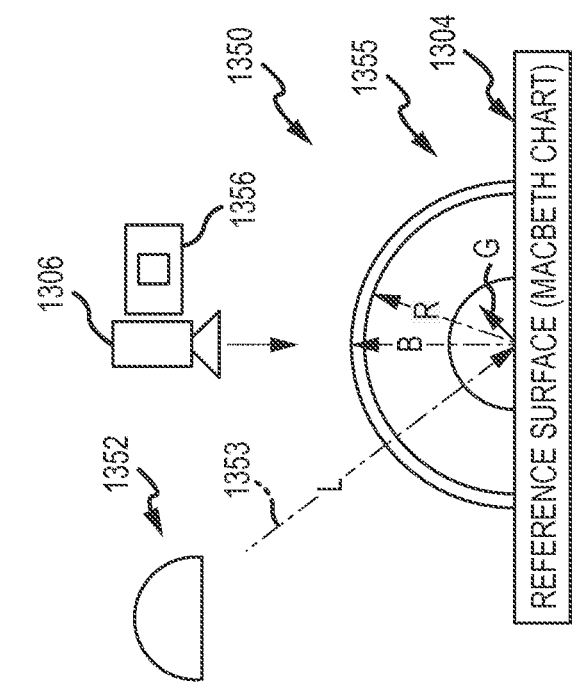

Further, with regard to changing ambient lighting conditions, FIG. 13E illustrates a graph 1350 for a viewing space in which ambient light 1353 is provided in the form of lower sunlight levels from source 1352 (shown as the setting Sun but another one or more light sources may be provided). The camera (or other sensor) 1306 is provided to capture images of the reference image/surface (e.g., a Macbeth chart/card or the like) 1304 with color responses or chromaticity levels 1355, which differ from earlier responses 1305, 1335 in full and partial sunlight, that can be used to determine a response profile 1356 with lower sunlight or sunset (or dawn/sunrise) conditions. Similarly, FIG. 13F illustrates a graph 1360 for the same viewing space with the same lighting conditions (e.g., Sun/source 1352 providing lower levels of sunlight 1353) where the camera 1306 is used to capture images of the target display surface (e.g., output content/light that may include a displayed image matching that of reference surface 1304 from an LCD or other display device screen) 1322. These images/captured data provide color responses or chromaticity levels 1363 of the content/surface 1322 in these lighting conditions (which differ from levels 1323, 1343 in full and partial sunlight) and can be used to determine a response profile 1354 for the target display surface 1322. The two response profiles 1356, 1364 can be compared to determine controls for the display device including the surface 1322 to modify its output to have the two profiles 1356, 1364 better match each other for the light 1353 being provided by source/Sun 1352.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the reference card and its image may take the form of a thematic real surface material swatch and a displayed image or version of this material may concurrently be provided via digital content on the display screen. The processor can then match the displayed material with the real material via sensing (e.g., by a single camera capturing digital images of both in the present environmental lighting and with the present operating parameter settings of the display). The control of the display then can be performed so as to modify operating parameters of the display device to better match (with chromaticity changes and/or illumination levels and/or changes in digital content) the two images sensed by the camera or other output sensing device.

The display devices used in the monitored and feedback controlled display systems may vary widely to practice the described concepts. For example, standard digital content delivery devices (such as those distributed by BrightSign, LLC and other distributors/manufacturers of digital signage) may be used in place of the LCDs, OLEDs, and similar displays discussed above. Also, non-flat displays may be used in the display systems and are well-suited for use with thematic overlay elements. The display may also include additional substrates and/or foreground materials, which are handled well with the adaptive control techniques taught herein in that the sampled reference and digital image are steered/controlled to match as closely as possible.

The display system may also be adapted for viewing by multiple viewers such as for display systems with view dependent materials and view dependent display material reflectance. A multitude of viewers of a mono-view screen may necessitate a range of coverage of the adaptive color model, as opposed to a single direct view recovery. Here, the context of use of the digital signage can inform the displayed results, e.g., an overhead menu screen view for a cone of angles (e.g., solid angle) with wide horizontal range and narrow range reduces the range of parameters that are optimized in the control process. Viewer tracking (as shown in FIG. 12, for example) may be desirable, though, for a more accurate recovery for a range of surface appearance approximations.

The display systems and the real time feedback control method it implements can facilitate a large number of interesting applications including: (1) sample the luminance and chromaticity values in a dynamic lit environment and inform the real time adjustment of the media to compensate for the environmental changes; (2) supports shadow play in interactive displays or enchanted art type illusions (e.g., a shadow in a picture or a tree could move as the Sun in the room changes); (3) supports infrared (IR) shadow play in interactive displays or enchanted art type illusions (e.g., the camera sensor could detect the invisible shadows of a viewer from a point source IR emitter and effect the displays artwork to appear to be casting interactive shadows from the visitor in the viewing space); (4) supports concepts that allow one to effect the room's lighting based on what is happening on the display screen (e.g., if a room/scene is equipped with projection, one could design a connection between a Sun in an enchanted art application and the lighting in the room/scene being projected by the hidden projectors and create shadows from the viewer in the room/scene as if the Sun were really the light source for the room); (5) in attractions where projection and show lighting need to blend, prior displays have lost that blend as the lamp in the projector degrades over its lifetime whereas the benchmarking tool can be used to adjust illumination and/or color levels as the lamp degrades over time; (6) the benchmarking tool has many uses in stage-based shows as well with real time actors and scenic illusions (e.g., the output light that is being sensed may not be from a display surface of a display device but may instead the display surface may be the scene on stage including the actors and scenery); and (7) dynamic lighting adjustment for movie and TV camera shoots may be provided with a display system of the present description (e.g., the camera and lighting systems in such applications are calibrated to a moment in time, and, if a shot takes a longer period of time to capture dynamic lighting conditions (e.g., sunshine and the like) change such that the lighting and calibration is lost, and the benchmarking tool and its output data may be used as the foundation for a solution to this problem by helping to maintain or regain calibration (output light-based data 1050 from benchmarking tool 1010 of FIG. 10 can be used as input to control cameras and lighting systems in these shoot applications)).

The methods and systems described herein are particularly well suited for the growing need for digital signage and display driven entertainment, which may involve blending a normal LCD display or other display device into a themed environment. For example, the theming of a standard high brightness LCD can be melded into a chalkboard, a wooden sign, a tapestry or even a brick wall. Specialized tools that would be useful to help us deliver and maintain these thematic displays had not been developed prior to the present invention and/or description. Hence, the inventors invented a tool that may be considered a comprehensive dynamic light sampler to maintain lighting requirements for a themed display in a show environment (and which, of course, has many other useful applications).

In some of the thematic display systems, the system designers are designing a themed display that uses layers of various semi-transparent printed and natural materials on top of the display device (e.g., an LCD or other transmissive device, an emissive device, or a reflective device) to camouflage it into something else (e.g. wood, chalkboard, brick, or a painting). The design is an exercise of negotiating the front reflective light onto the monitor and the light coming from the media displayed by or on the monitor. The issue for many display designs is when the designers are forced to install such a unit into an environment that has often changing ambient lighting conditions (i.e., a main street shop with the large windows that allow the sunlight to shine into the viewing space) the designers may not be able to maintain our illusion due to lack of control of the ambient lighting. The light sensors designed prior to the present invention for brightness control on LCD TVs are very limited and do not begin to address the needs of the display system designers.

To address this challenge, real time game engine shaders or the like can be used in a stand-alone sophisticated light tool (e.g., a benchmarking tool) that samples real time luminance and chromaticity values in a dynamic environment for the purpose of maintaining set lighting values in a given lighting system or in media displayed on the display device. After testing one prototype of the benchmarking tool, the inventors realized that this tool not only can solve some of the original lighting issues but can also give display system designers and others the ability to do a number of things that were not possible or practical before their development of the benchmarking tool and feedback control techniques/devices.

The following is a list of exemplary applications the benchmarking tool and feedback control loop may be used in: (a) sample the luminance and chromaticity values in a dynamic lit environment and inform the real time adjustment of the media to compensate for the environment changes; (b) support countless concepts for shadow play in interactive displays or enchanted art type illusions (e.g., a shadow in a picture of a tree could move as the sun in the room changes); (c) support countless concepts for IR shadow play in interactive displays or enchanted art type illusions (the camera sensor could detect the invisible shadows of a viewer/user from a point source IR emitter and effect the displays artworks to appear to be casting interactive shadows from the viewer/user); (d) support concepts that allow us to effect the room's lighting based on what was happening on the display (e.g., if a room is equipped with projection one could design a connection between a sun in an enchanted art application and the lighting in the room being projected by the hidden projectors, and create shadows from the viewer/user in the room as if the Sun were really the light source for the room); (e) in attractions where projection and show lighting need to blend, the blend can be lost as the lamp in the projector degrades over its lifetime, and this tool could make allowances for this if the system was designed correctly from the start; (f) there are uses for this tool on stage as well with real time actors and scenic illusions; and (g) dynamic lighting adjustment for movie and TV camera shoots (e.g., the camera and lighting systems are calibrated to a moment; however, if a shot takes a while to capture dynamic lighting conditions (e.g., sunshine) change the lighting and the calibration can be lost, and this tool is a foundation of a solution for this issue as well).

To summarize or review the technical description of the above-discussed concepts, the light monitoring and control solutions include both an interactive display benchmarking tool for display capabilities assessment and a real-time adaptive feedback system to represent real surfaces within the capability of the display. Further, this approach affords a number of creative applications (see the list above for example). The digital signage benchmarking tool may include a portable computing device with camera sensor (e.g., a RaspberryPi/PiCam or the like) and a color reference marker (e.g., a Macbeth color card or the like connected to the display via video signal cable). The embedded software tracks the location and orientation of the display via a fiducial marker it displays on the screen and a known location of the reference card. The screen also displays the color reference image. In order to analyze the display capability, both the reference card and image colors are sampled by the camera sensor. These RGB response samples are recorded for a range of yaw, pitch, front, and light poses to recover a response profile of the reference card colors against the displayed image colors. The resulting profile then provides an analysis of the display's ability to show surface reflectance appearance for a range of varying viewpoints and lighting conditions.

The real-time adaptive system takes this further in adapting the luminance and chrominance response of the digital display to account for different lighting and viewing direction. This can include the same hardware configuration, but further corrects the displayed digital signage content through means of real-time camera sensor processing and output via GPU shader computations. The algorithm takes input reference card samples compared with digital displayed color samples and adapts the output colors to match the reference card. A chroma/luminance model further efficiently maps the input samples to the full color display output gamut. In some cases, this mapping may not always be fully realizable with a given digital signage display due to dynamic range and display surface material properties. In such cases, a color appearance model (potentially spatial varying across the display surface) for perceptual adaption is applicable.

The reference card may be integrated into the thematics of the scene/display so as to appear unobtrusive. Alternative camera sensors with reference card configuration may further be adapted to the theme of the setting/display. That is, a Macbeth color card and regular camera are not essential to practicing the invention, where individual light sensing diodes or spherical lens cameras may be sufficient. A further hardware configuration with standard digital content delivery devices (e.g., devices from BrightSign) may be utilized. Also, non-flat displays are also suitable to adapt in themed contexts. The display may comprise additional substrates, foreground materials, and the like, which are also handled in the adaptive model in that the sampled reference and digital image are steered to match as closely as possible. Particular materials may require a custom model.

Multiple viewers of a given display is also of consideration for view dependent materials (and view dependent display material reflectance). A multitude of viewers of a mono-view screen can be addressed in part with a range of coverage of the adaptive color model, as opposed to a single direct view recovery. Here, the context of use of the digital signage can inform the displayed results, e.g. an overhead menu screen view for a cone of angles (solid angle) with wide horizontal range and narrow vertical range reduces the range of parameters to be optimized. Viewer tracking may be preferable for a more accurate recovery and similarly multi-viewer tracking can be used for a range of surface appearance approximations.

In this description, the inventors have proposed and described a device that can be used quickly and semi-automatically to benchmark displays to assess their capability of simulating other existing natural surfaces. Unlike existing tools, the device and methods are meant to capture the perceptual qualities of a display as a whole, rather than at the sub-pixel level. This involves the detection of display surface reflectance, viewing angles aberrations, surface roughness, environmental lighting, and several other factors. The description also proposes and describes an extension to the benchmarking work (which seeks to understand the perceptual qualities of a display in a static environment) that functions adaptively in order to emulate natural surfaces in dynamic environments. This separate device should be capable of processing captured information from a viewer's perspective and adapt the content displayed on a given monitor such that it appears perceptually equivalent to the same content on the target surface one wishes to simulate. This involves capturing the physical properties of the display and environment as well as understanding the viewer's perception of displayed content all from a single device.

While many of the exemplary display devices described above were display devices with a display screen, other embodiments may utilize one or more video projectors that project light (or content) onto a projection screen (which may be nearly any surface and is not limited to but may include rear or front projection screens).

It may be useful to provide additional examples of applications of uses of the tools, systems, and techniques described herein. In one example, a film crew may be filming outside with a set, and they calibrate the cameras and lighting instruments to work with the ambient lighting at the time of the shoot. Many times it can take hours to get a single scene to play out correctly, so the camera man keeps shooting. Over the shooting span or time, the ambient lighting changes such as when the Sun moves, and adjustments and calibrations to the equipment are, as a result, made over and over. This is time consuming. The benchmarking tool and control techniques may be used in such a filming and lighting system to control the calibration of the cameras filming the set and/or lighting used to provide or modify (or add to) ambient light so as to provide real time and/or periodic adjustments in a more accurate manner that may optionally be automated. In another example, the tools and techniques may work very well for a lamp-based projector in a scene where the light from one or more projectors have to stay balanced or where the light from the projector and the show lighting need to stay balanced. Lamps in video projectors start to degrade soon after they are new, and luminosity and chromaticity changes quickly in the video projector and can cause the loss of desired blends. The tools described herein could be used as the foundation of a control system that would adjust lamp-based video projector settings and controls or modify (e.g., color correct) the media itself to better suit the present condition of the video projector and/or the overall display system.

In another example, the tools and techniques may work very well for a lamp-based projector in a scene where the light from one or more projectors have to stay balanced or where the light from the projector and the show lighting needed to stay balanced. Lamps in video projectors start to degrade soon after they are new, and luminosity and chromaticity changes quickly in the video projector and can cause the loss of desired blends. The tools described herein could be used as the foundation of a control system that would adjust lamp-based video projector settings and controls or modify (e.g., color correct) the media itself to better suit the present condition of the video projector and/or the overall display system.

We claim:

1. An apparatus for displaying content to a viewer in a viewing space, comprising:
   a display device with a display screen providing digital content as displayed content on a surface of the display screen; and
   a display control assembly comprising an output sensing element sensing output light from the display screen, wherein the display control assembly processes the sensed output light to generate output light-based data and modifies an operating parameter of the display device based on the output light-based data to modify a characteristic of the displayed content,
   wherein the display control assembly further comprises a control image element displaying a reference card image with a pattern of colored objects,
   wherein the output sensing element comprises a sensor or camera concurrently capturing color response samples from the reference card image and the displayed content from the surface of the display screen, and
   wherein the output light-based data includes a response profile generated by comparing the color response samples associated with the reference card image and the displayed content, whereby the operating parameter of the display device is modified to cause the color response samples from the displayed content to match the color response samples associated with the reference card image.

2. The apparatus of claim 1, wherein the operating parameter is a software or hardware parameter adjusting chromaticity levels of the displayed content.

3. The apparatus of claim 1, wherein the digital content includes an image of the pattern of colored objects whereby the displayed content includes a displayed version of the image of the pattern of colored objects and wherein the response profile is generated by comparing the color response samples associated with the reference card image and the displayed version of the image of the pattern of colored objects.

4. The apparatus of claim 3, wherein the digital content includes a fiducial marker and wherein the display control assembly processes an image captured by the sensor or camera to determine an orientation of the display screen relative to the sensor or camera based on a displayed version of the fiducial marker.

5. The apparatus of claim 1, wherein the display control assembly further operates to modify, based on the response profile, operations of a light source external to the display device to modify at least one of luminance and chromaticity of light striking the display screen.

6. The apparatus of claim 1, wherein the display screen comprises a projector screen and the display device includes a video projector.

7. An apparatus for displaying content to a viewer in a viewing space, comprising:
   a display device with a display screen providing digital content and a light source transmitting light through the display screen such that the digital content is visible as displayed content on a surface of the display screen;
   a thematic overlay positioned over the display screen, wherein the thematic overlay includes a rear surface facing the display screen and a front surface, opposite the rear surface, that is configured to provide diffuse reflection of light striking the front surface from the viewing space, whereby output light of the apparatus is a combination of the displayed content from the surface of the display screen and the diffuse reflection of light from the thematic overlay;

a digital signage benchmarking tool comprising an output sensing element sensing the output light and a benchmarking module processing the sensed output light to generate output light-based data; and a feedback control module modifying an operating parameter of the display device based on the output light-based data to modify the light transmitted through the display screen of the display device, wherein the digital signage benchmarking tool further comprises a control image element displaying a reference card image with a pattern of colored objects, wherein the output sensing element comprises a sensor or camera concurrently capturing red-green-blue (RGB) response samples from the reference card image and the displayed content from the surface of the display screen, and wherein the output light-based data includes a response profile generated by the benchmarking module by comparing the RGB response samples associated with the reference card image and the displayed content.

8. The apparatus of claim 7, wherein the operating parameter is a hardware or software parameter that is at least one of an adjustable illumination level and an adjustable chromaticity level.

9. The apparatus of claim 7, wherein the feedback control module further operates to modify the digital content to provide at least one portion in the displayed content having an adjusted chromaticity.

10. The apparatus of claim 7, wherein the digital content includes an image of the pattern of colored objects whereby the displayed content includes a displayed version of the image of the pattern of colored objects and wherein the response profile is generated by comparing the RGB response samples associated with the reference card image and the displayed version of the image of the pattern of colored objects.

11. The apparatus of claim 10, wherein the digital content includes a fiducial marker and wherein the benchmarking module processes an image captured by the sensor or camera to determine an orientation of the display screen relative to the sensor or camera based on a displayed version of the fiducial marker.

12. The apparatus of claim 11, wherein the camera or sensor is positioned in a plurality of differing locations in the viewing spaces during the sensing of the output light.

13. The apparatus of claim 7, wherein the feedback control module further operates to modify operations of a light source to modify at least one of luminance and chromaticity of the light striking the front surface of the thematic overlay.

14. A benchmarking tool for use with digital signage and in other applications, comprising:

a control image element positionable in a space displaying a reference card image including a pattern of colored objects;

an output-sensing element capturing a first set of red-green-blue (RGB) response samples from the reference card image and a second set of RGB response samples from a surface in the space including the control image element; and a processor executing code to provide a benchmarking module to process the first and second sets of the RGB response samples to generate a response profile, wherein the benchmarking module generates the response file by comparing values in the first and second sets of RGB responses, and wherein the surface includes a second version of the reference card image.

15. The benchmarking tool of claim 14, wherein the surface in the space comprises a screen of a display device and the second version of the reference card image comprises content displayed based on a digital version of the reference card image.

16. The benchmarking tool of claim 14, wherein the reference card image comprises a Macbeth card image.

17. A method of controlling a display system, comprising: with a sensor or camera, first collecting monitoring data including chromaticity for a reference card displayed on a control image element positioned in a viewing space; with a sensor or camera, second collecting monitoring data including chromaticity for displayed content on a display surface of a display device; processing the monitoring data from the first and second collecting steps; and based on results of the processing, adjusting at least one of a color setting in digital content used to produce the displayed content on the display surface and a hardware or software parameter of the display device affecting the chromaticity of the displayed content, wherein the first and second collecting steps are performed concurrently, and wherein the reference card comprises a pattern of colored objects.

18. The method of claim 17, wherein the displayed content includes an image corresponding to the reference card.

19. The method of claim 17, wherein the adjusting of the color setting in the digital content includes adjusting pixel RGB values.

20. The method of claim 17, wherein the hardware parameter of the display device includes one of monitor brightness, monitor temperature, and monitor color settings.

21. The method of claim 17, further comprising gathering position information for a viewer in the viewing space and processing the position information to determine a viewpoint of the viewer for the display surface, wherein the adjusting is performed based on the processing of a subset of the monitoring data associated with the viewpoint of the viewer.

22. The method of claim 17, further comprising, based on the processing of the monitoring data, adjusting illumination or chromaticity of a light source directing light onto the display surface or into the viewing space.

23. The apparatus of claim 17, wherein the display surface comprises a projector screen and the display device includes a video projector.

* * * * *